US012146328B2

(12) United States Patent
Matsuno et al.

(10) Patent No.: US 12,146,328 B2
(45) Date of Patent: Nov. 19, 2024

(54) REBAR TYING ROBOT

(71) Applicant: MAKITA CORPORATION, Anjo (JP)

(72) Inventors: Tadasuke Matsuno, Anjo (JP); Kazuki Oguchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 237 days.

(21) Appl. No.: 17/793,787

(22) PCT Filed: Nov. 17, 2020

(86) PCT No.: PCT/JP2020/042807
§ 371 (c)(1),
(2) Date: Jul. 19, 2022

(87) PCT Pub. No.: WO2021/161607
PCT Pub. Date: Aug. 19, 2021

(65) Prior Publication Data
US 2023/0094722 A1     Mar. 30, 2023

(30) Foreign Application Priority Data

Feb. 13, 2020   (JP) .................................. 2020-022789

(51) Int. Cl.
*E04G 21/12*     (2006.01)
*B21F 27/08*     (2006.01)
(Continued)

(52) U.S. Cl.
CPC ............ *E04G 21/123* (2013.01); *B21F 27/08* (2013.01); *B21F 33/00* (2013.01); *B25J 5/00* (2013.01); *B65B 27/10* (2013.01)

(58) Field of Classification Search
CPC .......... B21F 15/00; B21F 15/02; B21F 15/04; B65B 13/22; B65B 13/28; B65B 13/285;
(Continued)

(56) References Cited

U.S. PATENT DOCUMENTS

| 2006/0060395 A1 | 3/2006 | Boivin et al. |
| 2009/0166101 A1 | 7/2009 | Wenger et al. |
| 2018/0187432 A1 | 7/2018 | Itagaki |

(Continued)

FOREIGN PATENT DOCUMENTS

| CN | 101909971 A | 12/2010 |
| CN | 110118017 A | 8/2019 |

(Continued)

OTHER PUBLICATIONS

Translation of JP-2019039174 (Year: 2019).*
(Continued)

*Primary Examiner* — Bobby Yeonjin Kim
(74) *Attorney, Agent, or Firm* — Oliff PLC

(57) ABSTRACT

A rebar tying robot configured to tie a plurality of first rebars and a plurality of second rebars intersecting the plurality of first rebars at points where the plurality of first rebars and the plurality of second rebars intersect. The rebar tying robot may include a rebar tying machine, a conveying unit configured to convey the rebar tying machine, and a control unit configured to control an operation of the conveying unit. The conveying unit may include a crawler configured to move on the plurality of first rebars and the plurality of second rebars.

14 Claims, 25 Drawing Sheets

(51) Int. Cl.
  *B21F 33/00* (2006.01)
  *B25J 5/00* (2006.01)
  *B65B 27/10* (2006.01)

(58) Field of Classification Search
  CPC ....... B65B 13/025; B65B 13/04; B65B 13/06; B65B 27/10; B65B 27/20; B65B 27/08; B25B 25/00; E04G 21/123; E04G 21/122
  See application file for complete search history.

(56) References Cited

U.S. PATENT DOCUMENTS

| 2018/0187434 | A1 | 7/2018 | Itagaki et al. |
| 2019/0249447 | A1 | 8/2019 | Itagaki et al. |
| 2021/0010282 | A1 | 1/2021 | Itagaki et al. |
| 2021/0148127 | A1 | 5/2021 | Itagaki |
| 2021/0156160 | A1 | 5/2021 | Manabe et al. |

FOREIGN PATENT DOCUMENTS

| JP | 2004-255569 A | 9/2004 |
| JP | 5542092 B2 | 7/2014 |
| JP | 2018-109296 A | 7/2018 |
| JP | 2018-109298 A | 7/2018 |
| JP | 2019-038088 A | 3/2019 |
| JP | 2019-039170 A | 3/2019 |
| JP | 2019039174 A * | 3/2019 |
| JP | 6633720 B1 | 1/2020 |

OTHER PUBLICATIONS

Nov. 29, 2023 Office Action issued in Chinese Patent Application No. 202080096490.3.
Jan. 26, 2021 Search Report issued in International Patent Application No. PCT/JP2020/042807.
Aug. 11, 2022 International Preliminary Report on Patentability issued in International Patent Application No. PCT/JP2020/042807.
Oct. 17, 2023 Office Action issued in Japanese Patent Application No. 2020-022789.
Aug. 1, 2023 Office Action issued in Japanese Patent Application No. 2020-022789.
May 7, 2024 Office Action issued in Chinese Patent Application No. 202080096490.3.

* cited by examiner

REBAR TYING ROBOT

TECHNICAL FIELD

The art disclosed herein relates to a rebar tying robot.

BACKGROUND

Patent Literature 1 describes a rebar tying robot configured to tie a plurality of first rebars and a plurality of second rebars intersecting the plurality of first rebars at points where the plurality of first rebars and the plurality of second rebars intersect. The rebar tying robot includes a rebar tying unit, a conveying unit configured to convey the rebar tying unit, and a control unit configured to control an operation of the conveying unit. The conveying unit includes wheels configured to move on the plurality of first rebars or the plurality of second rebars by using a part of the rebars as rails. Patent Literature 2 also describes a rebar tying robot having a similar configuration.

CITATION LIST

Patent Literatures

Patent Literature 1: Japanese Patent Application Publication No. 2019-39174
Patent Literature 2: Japanese Patent No. 6633720

SUMMARY

Technical Problem

In a configuration as described above having wheels that move by using a part of a plurality of first rebars or a plurality of second rebars as rails, a moving performance is degraded as a weight of the rebar tying robot increases. The disclosure herein provides art by which a moving performance is not degraded so much even when a weight of a rebar tying robot increases.

Solution to Technical Problem

The disclosure discloses a rebar tying robot configured to tie a plurality of first rebars and a plurality of second rebars intersecting the plurality of first rebars at points where the plurality of first rebars and the plurality of second rebars intersect. The rebar tying robot may comprise a rebar tying unit, a conveying unit configured to convey the rebar tying unit, and a control unit configured to control an operation of the conveying unit. The conveying unit may comprise a crawler configured to move on the plurality of first rebars and the plurality of second rebars.

As above, in accordance with the configuration having the crawler that moves on the plurality of first rebars and the plurality of second rebars, degradation of a moving performance can be suppressed even when a weight of the rebar tying robot increases.

DESCRIPTION OF EMBODIMENTS

Figure 1:
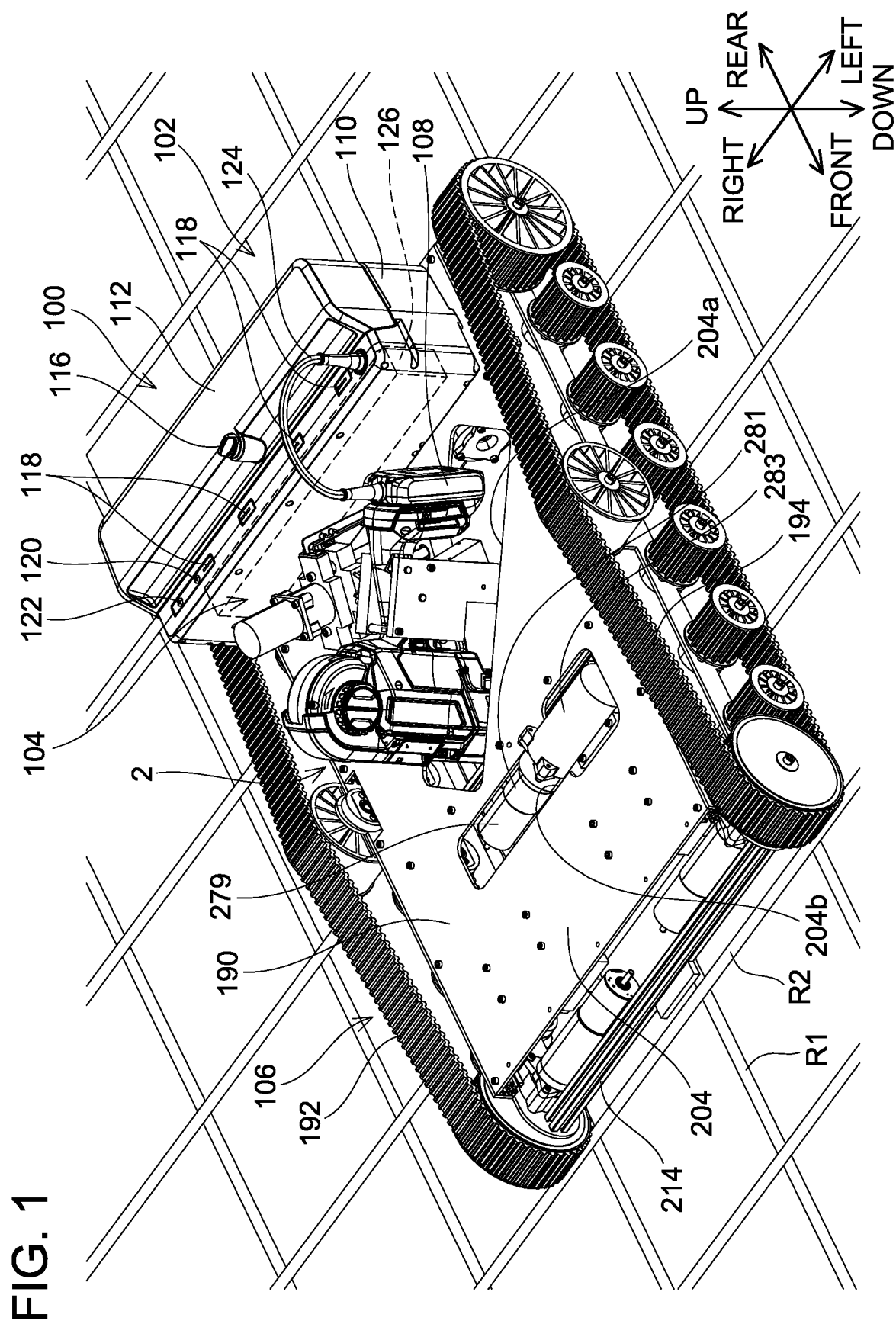
FIG. 1 is a perspective view of a rebar tying robot 100 of an embodiment viewed from the front left upper side.

Representative, non-limiting examples of the present disclosure will now be described in detail below with reference to the attached drawings. This detailed description is merely intended to teach a person of skill in the art further details for practicing aspects of the present teachings and is not intended to limit the scope of the present disclosure. Furthermore, each of the additional features and teachings disclosed may be utilized separately or in conjunction with other features and teachings to provide improved rebar tying robots as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the below-described representative examples, as well as the various features of those described in the claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the subject matter in the claims, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the subject matter in the claims.

In one or more embodiments, a rebar tying robot may be configured to tie a plurality of first rebars and a plurality of second rebars intersecting the plurality of first rebars at points where the plurality of first rebars and the plurality of second rebars intersect. The rebar tying robot may comprise a rebar tying unit, a conveying unit configured to convey the rebar tying unit, and a control unit configured to control an operation of the conveying unit. The conveying unit may comprise a crawler configured to move on the plurality of first rebars and the plurality of second rebars.

As above, according to the configuration that comprises the crawler configured to move on the plurality of first rebars and the plurality of second rebars, degradation of a moving performance can be suppressed even when a weight of the rebar tying robot increases.

In one or more embodiments, the conveying unit may further comprise a side stepper. The side stepper may comprise a step bar, and a stepper motor configured to drive the step bar along a predetermined side-stepping track. When the step bar moves along the side-stepping track, a lower end of the step bar may move to a position lower than a lower end of the crawler, then the lower end of the step bar may move in a left-right direction, and then the lower end of the step bar may move to a position higher than the lower end of the crawler.

According to the above configuration, the crawler can move in a front-rear direction and the side stepper also can move in the left-right direction on the plurality of first rebars and the plurality of second rebars. A mobility performance of the rebar tying robot can further be improved.

In one or more embodiments, the step bar may extend in a front-rear direction.

When, for example, the plurality of second rebars is arranged on top of the plurality of first rebars, normally the rebar tying robot moves with a direction intersecting the plurality of second rebars as its front-rear direction such that the crawler traverses across the plurality of second rebars. According to the above configuration, since the step bar used for the side stepper to move in the left-right direction extends in the front-rear direction, the step bar can be arranged across the plurality of second rebars when the step bar is lowered. By configuring as such, stability when the side stepper moves in the left-right direction can further be improved.

In one or more embodiments, the step bar may comprise a first step bar and a second step bar arranged on a left or right side of the first step bar. The first step bar and the second step bar may be coupled to each other.

According to the above configuration, since multiple step bars are used when the side stepper moves in the left-right direction, the stability can further be improved. Further, according to the above configuration, since the first step bar and the second step bar are coupled to each other, their operations can mechanically be synchronized, and the stability when the side stepper moves in the left-right direction can further be improved.

In one or more embodiments, the side-stepping track may have an upper edge and a lower edge extending in the left-right direction, and a right edge and a left edge extending in an up-down direction.

According to the above configuration, a step width in the movement of the side stepper in the left-right direction can be made constant.

In one or more embodiments, the rebar tying robot may further comprise a battery configured to supply power to the conveying unit. One of the battery and the stepper motor may be arranged at a front part of the rebar tying robot. The other of the battery and the stepper motor may be arranged at a rear part of the rebar tying robot.

According to the above configuration, a gravity center of the rebar tying robot can be suppressed from being displaced forward or rearward.

In one or more embodiments, the power from the battery may be supplied to the rebar tying unit.

According to the above configuration, a shared battery can be used to supply power to both the conveying unit and the rebar tying unit.

In one or more embodiments, the crawler may comprise a right crawler and a left crawler configured to operate separately from the right crawler.

According to the above configuration, not only the movement in the front-rear direction, but also movement in various other configurations can be realized by the crawler. The mobility performance of the rebar tying robot can further be improved.

In one or more embodiments, the rebar tying robot may further comprise a position detection sensor configured to detect a position of a first rebar in the left-right direction to be subjected to a tying operation among the plurality of first rebars. The control unit may be configured to provide a speed difference between the right crawler and the left crawler so that a position of the first rebar in left-right direction detected by the position detection sensor becomes closer to a reference position.

If the position of the first rebar in the left-right direction is displaced from the reference position, it may be difficult for the rebar tying unit to perform the tying operation. According to the above configuration, the rebar tying robot can be moved so that the position of the first rebar in the left-right direction becomes closer to the reference position.

In one or more embodiments, the rebar tying robot may further comprise an angle detection sensor configured to detect an angle of the first rebar to be subjected to the tying operation among the plurality of first rebars. The control unit may be configured to provide a speed difference between the right crawler and the left crawler so that an angle of the first rebar detected by the angle detection sensor becomes closer to a reference angle.

If the angle of the first rebar is displaced from the reference angle, it may be difficult for the rebar tying unit to perform the tying operation. According to the above configuration, the rebar tying robot can be moved so that the angle of the first rebar becomes closer to the reference angle.

In one or more embodiments, the control unit may be configured to, when providing the speed difference between the right crawler and the left crawler, cause one of the right crawler and the left crawler to operate at a normal speed and the other of the right crawler and the left crawler to operate at a speed reduced from the normal speed.

According to the above configuration, the speed difference can be provided between the right crawler and the left crawler without increasing the speeds of the right and left crawlers beyond the normal speed. Due to this, the speed difference can be provided between the right and left crawlers without size increase and weight increase in prime mover(s) of the right and left crawlers. When the right and left crawlers are operated as above, the other of the right and left crawlers (one of them of which speed is reduced from the normal speed) may operate at a speed in a direction opposite to a moving direction of the rebar tying robot.

In one or more embodiments, the rebar tying unit may comprise a rebar tying machine configured to be detachably attached to the rebar tying robot. The rebar tying machine may comprise a grip configured to be gripped by a user, a body arranged at one end of the grip, and a battery receptacle arranged at the other end of the grip and configured to detachably receive a battery pack.

According to the above configuration, a rebar tying machine that is used in general and commercially available may be used by attaching the same to the rebar tying robot as the rebar tying unit.

In one or more embodiments, the rebar tying robot may comprise an adapter configured to be detachably attached to the battery receptacle in place of the battery pack.

Normally, a battery pack that is configured to be detachably attached to the rebar tying machine is compact and thus has a small capacity, and it is difficult to perform work over a long period of time. According to the above configuration, since the power can be supplied from the rebar tying robot to the rebar tying machine through the adapter, work can be performed over a longer period of time as compared to the case in which the battery pack is attached to the rebar tying machine.

Embodiment

As shown in FIG. 1, a rebar tying robot 100 of the present embodiment comprises a rebar tying machine 2, a power supply unit 102, an operation unit 104, and a conveying unit 106. The rebar tying robot 100 is a robot configured to move on a plurality of first rebars R1 arranged parallel to each other along a horizontal direction and a plurality of second rebars R2 arranged parallel to each other along the horizontal direction and tie the first rebars R1 and the second rebars R2 at points where the first rebars R1 and the second rebars R2 intersect by using the rebar tying machine 2. When the first rebars R1 and the second rebars R2 are viewed from above, a direction along which the second rebars R2 extend intersects perpendicularly to a direction along which the first rebars R1 extend. Further, the second rebars R2 are arranged on top of the first rebars R1. The first rebars R1 are arranged at an interval of 100 mm to 300 mm and the second rebars R2 are arranged at an interval of 100 mm to 300 mm, for example. The rebar tying robot 100 has a dimension of about 900 mm in a front-rear direction and a dimension of about 600 mm in a left-right direction, for example.

(Configuration of Rebar Tying Machine 2)

Hereinbelow, a configuration of the rebar tying machine 2 will be described with reference to FIGS. 2 to 5. It is hereby noted that a front-rear direction, a left-right direction, and an up-down direction in the explanation of FIGS. 2 to 5 are not a front-rear direction, a left-right direction, and an up-down direction with the rebar tying robot 100 as the reference, but are a front-rear direction, a left-right direction, and an up-down direction with the rebar tying machine 2 as the reference.

Figure 2:
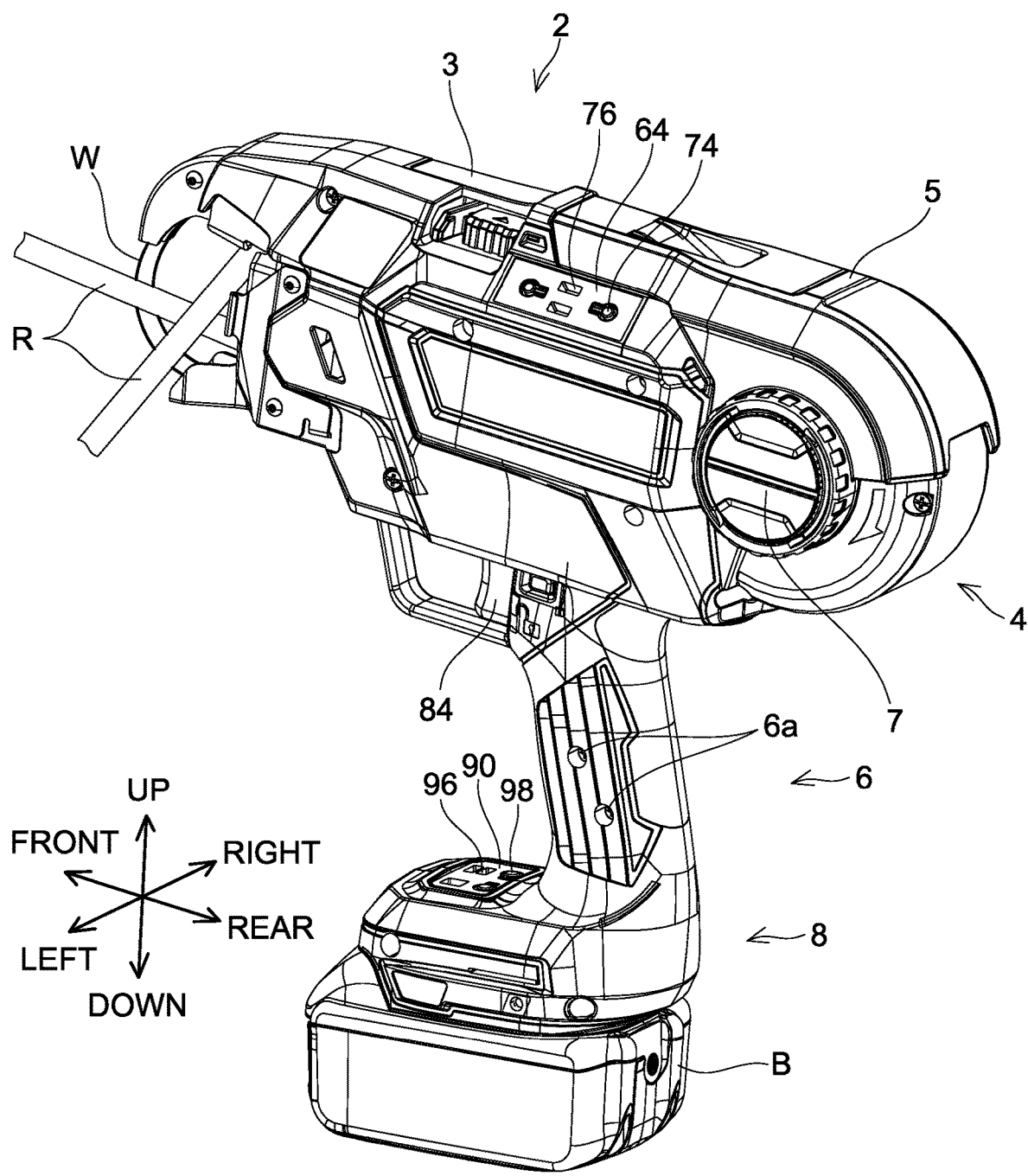
FIG. 2 is a perspective view of a rebar tying machine 2 used in the rebar tying robot 100 of the embodiment viewed from the rear left upper side.

As shown in FIG. 2, the rebar tying machine 2 is a power tool for tying rebars R intersecting each other (such as a first rebar R1 and a second rebar R2) by a wire W. The rebar tying machine 2 can be detached from the rebar tying robot 100 and used by a user as a handheld tool and can also be used by attaching it to the rebar tying robot 100. The rebar tying machine 2 comprises a housing 3. The housing 3 includes a body 4, a grip 6 arranged below the body 4, and a battery receptacle 8 arranged below the grip 6. A battery pack B may be attached to a lower portion of the battery receptacle 8 as shown in FIG. 2, or a battery adapter 108 may be attached thereto as shown in FIG. 1. The battery pack B includes secondary battery cells (not shown) such as lithium-ion battery cells, and is configured to be charged by a charger (not shown). The body 4, the grip 6, and the battery receptacle 8 are integrally configured.

Figure 3:
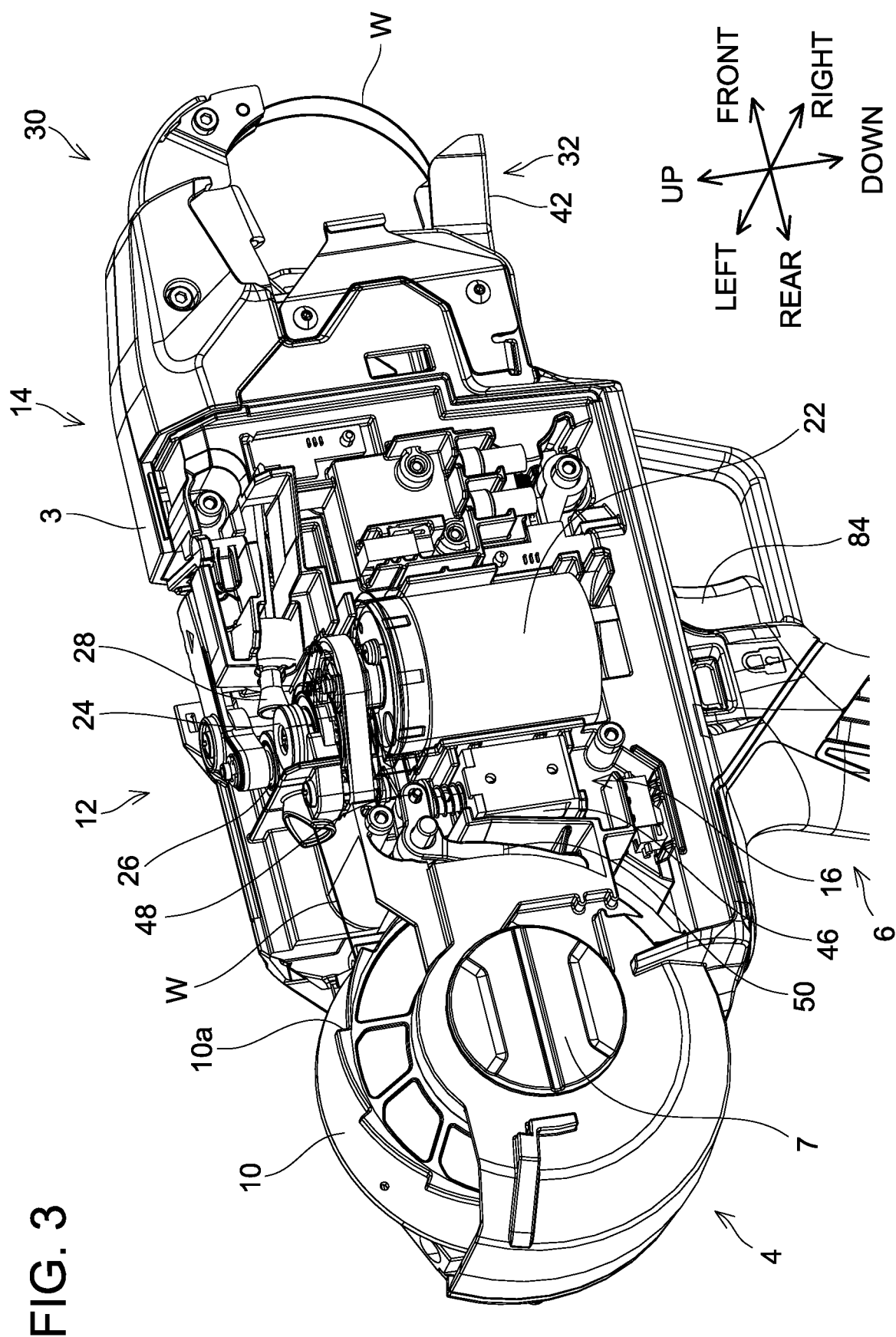
FIG. 3 is a perspective view of an internal structure of a body 4 of the rebar tying machine 2 used in the rebar tying robot 100 of the embodiment viewed from the rear right upper side.

As shown in FIG. 3, a reel 10 on which the wire W is wound is detachably housed in a rear upper portion of the body 4. As shown in FIG. 2, the housing 3 includes a reel cover 5 having a shape that covers an upper portion of the reel 10. The reel cover 5 is rotatably retained by cover retainers 7 arranged at rear left and right sides of the body 4. The reel cover 5 is configured to open and close by rotating with respect to the body 4.

Figure 4:
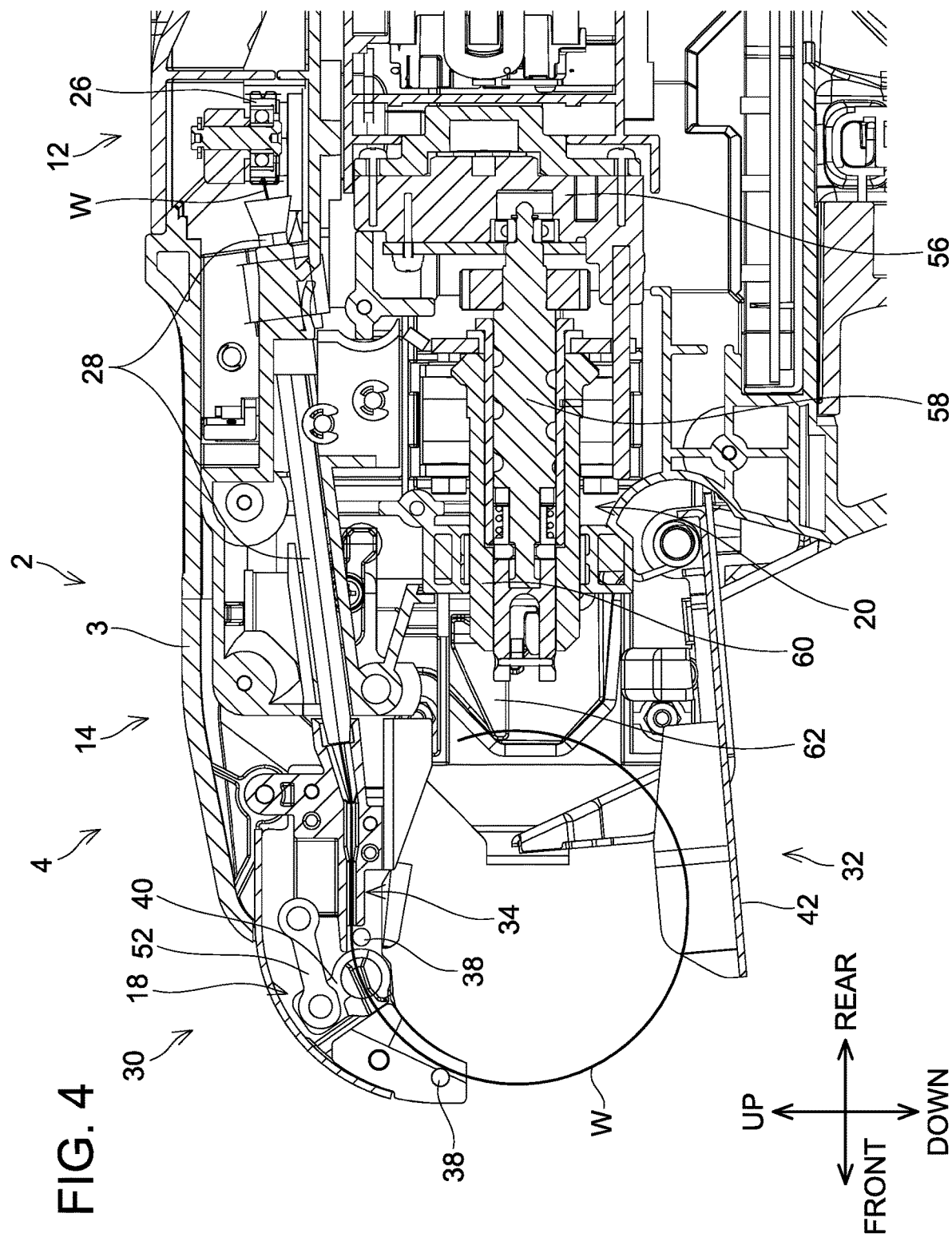
FIG. 4 is a cross-sectional view of a front part of the body 4 of the rebar tying machine 2 used in the rebar tying robot 100 of the embodiment.
Figure 5:
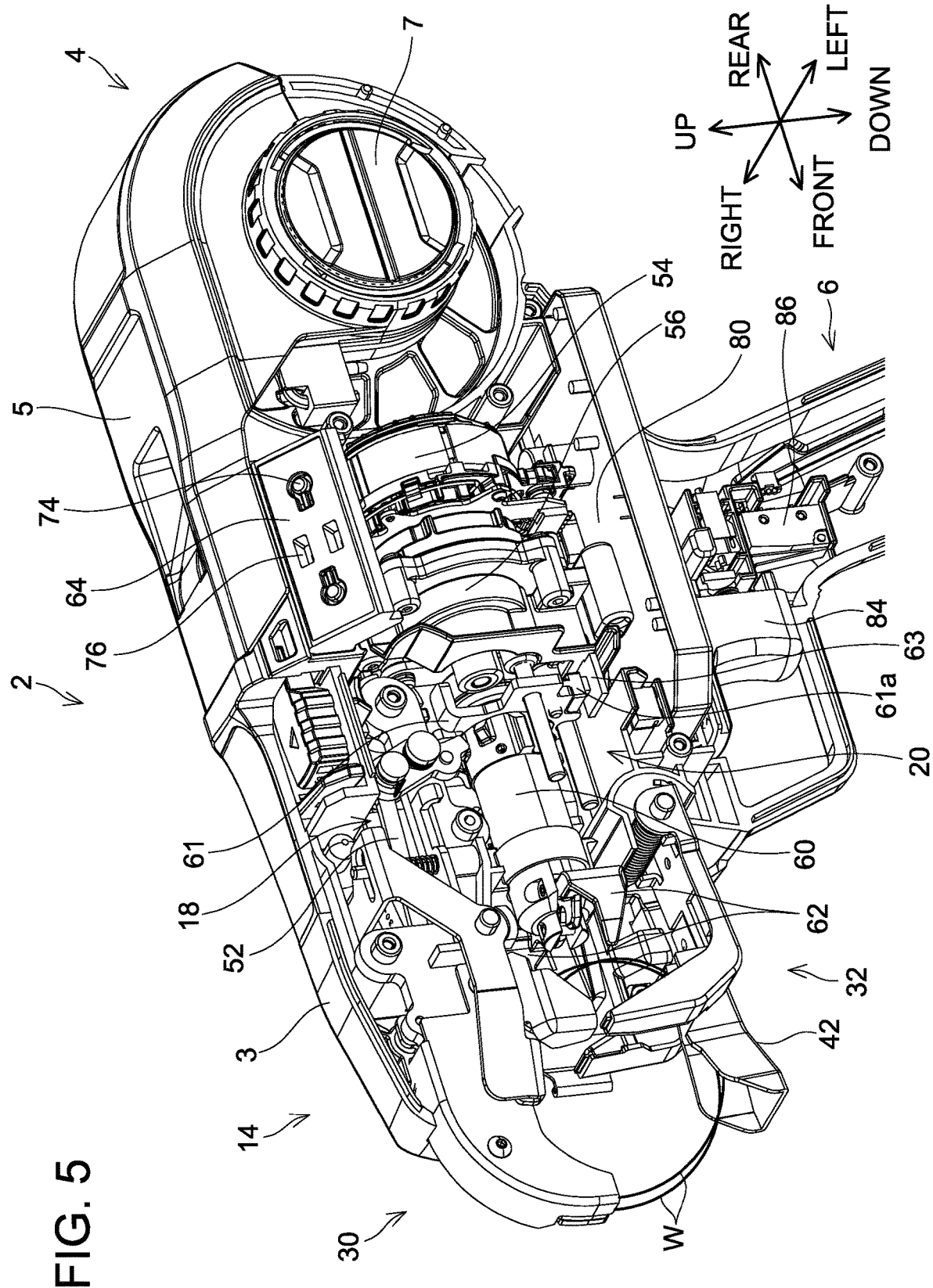
FIG. 5 is a perspective view of internal structures of the body 4 and an upper portion of a grip 6 of the rebar tying machine 2 used in the rebar tying robot 100 of the embodiment viewed from the front left upper side.

As shown in FIGS. 3 to 5, the rebar tying machine 2 comprises a feeder mechanism 12, a guide mechanism 14, a brake mechanism 16, a cutter mechanism 18, a twister mechanism 20, and a controller 80.

As shown in FIG. 3, the feeder mechanism 12 is configured to feed out the wire W supplied from the reel 10 to the guide mechanism 14 located in a front part of the body 4. The feeder mechanism 12 includes a feed motor 22, a driving roller 24, and a driven roller 26. The wire W is to be held between the driving roller 24 and the driven roller 26. The feed motor 22 may for example be a DC brush motor. An operation of the feed motor 22 is controlled by the controller 80. The feed motor 22 is configured to rotate the driving roller 24. When the feed motor 22 rotates the driving roller 24, the driven roller 26 rotates in a reverse direction and the wire W held by the driving roller 24 and the driven roller 26 is thereby fed out toward the guide mechanism 14, and the wire W is drawn out from the reel 10.

As shown in FIG. 4, the guide mechanism 14 is configured to guide the wire W fed out from the feeder mechanism 12 around the rebars R in a loop shape. The guide mechanism 14 includes a guide pipe 28, an upper curl guide 30, and a lower curl guide 32. The rear end of the guide pipe 28 opens into a space between the driving roller 24 and the driven roller 26. The wire W fed out from the feeder mechanism 12 is fed into the guide pipe 28. The front end of the guide pipe 28 opens into the upper curl guide 30. The upper curl guide 30 includes therein a first guiding passage 34 for guiding the wire W fed from the guide pipe 28 and a second guiding passage (not shown) for guiding the wire W fed from the lower curl guide 32.

As shown in FIG. 4, the first guiding passage 34 includes a plurality of guide pins 38 configured to guide the wire W such that they give a downward curl to the wire W and a cutter 40 that constitutes a part of the cutter mechanism 18 to be described later. The wire W fed from the guide pipe 28 is guided by the guide pins 38 in the first guiding passage 34, passes through the cutter 40, and is fed out toward the lower curl guide 32 from the front end of the upper curl guide 30.

As shown in FIG. 5, the lower curl guide 32 includes a feed-returning plate 42. The feed-returning plate 42 is configured to guide the wire W fed out from the front end of the upper curl guide 30 to return to the rear end of the second guiding passage of the upper curl guide 30.

The second guiding passage of the upper curl guide 30 is arranged adjacent to the first guiding passage 34. The second guiding passage is configured to guide the wire W fed from the lower curl guide 32 and feed it out from the front end of the upper curl guide 30 toward the lower curl guide 32.

The wire W fed out from the feeder mechanism 12 is wound in the loop shape around the rebars R by the upper curl guide 30 and the lower curl guide 32. The number of turns of the wire W to be formed around the rebars R can be preset by the user. When the feeder mechanism 12 feeds out the wire W by a feed amount corresponding to the set number of turns, it stops the feed motor 22 and thus stops feeding out the wire W.

The brake mechanism 16 shown in FIG. 3 is configured to stop rotation of the reel 10 in conjunction with the feeder mechanism 12 stopping feeding out the wire W. The brake mechanism 16 includes a solenoid 46, a link 48, and a brake arm 50. An operation of the solenoid 46 is controlled by the controller 80. The reel 10 includes engagement portions 10a arranged along its radial direction at a predetermined angular interval and each engagement portion 10a is configured to engage with the brake arm 50. With the solenoid 46 not electrically actuated, the brake arm 50 is separated from the engagement portions 10a of the reel 10. With the solenoid 46 electrically actuated, the brake arm 50 is driven via the link 48, and the brake arm 50 engages with the engagement portions 10a of the reel 10. When the feeder mechanism 12 is to feed out the wire W, the controller 80 maintains the brake arm 50 separated from the engagement portions 10a of the reel 10 by not electrically actuating the solenoid 46. Due to this, the reel 10 can rotate freely, and the feeder mechanism 12 can draw out the wire W from the reel 10. Further, when the feeder mechanism 12 stops feeding out the wire W, the controller 80 electrically actuates the solenoid 46 and causes the brake arm 50 to engage with the engagement portions 10a of the reel 10. As a result, rotation of the reel 10 is prohibited. Due to this, the wire W can be prevented from sagging between the reel 10 and the feeder mechanism 12, which would be caused by the reel 10 continuing to rotate by inertia even after the feeder mechanism 12 has stopped feeding out the wire W.

The cutter mechanism 18 shown in FIGS. 4 and 5 is configured to cut the wire W with the wire W wrapped around the rebars R. The cutter mechanism 18 includes the cutter 40 and a link 52. The link 52 is configured to cooperate with the twister mechanism 20 to be described later and rotates the cutter 40. The wire W passing through the cutter 40 is cut by rotation of the cutter 40.

The twister mechanism 20 shown in FIG. 5 is configured to tie the rebars R with the wire W by twisting the wire W wrapped around the rebars R. The twister mechanism 20 includes a twisting motor 54, a reduction gear mechanism 56, a screw shaft 58 (see FIG. 4), a sleeve 60, a push plate 61, and a pair of hooks 62.

The twisting motor 54 may for example be a DC brushless motor. An operation of the twisting motor 54 is controlled by the controller 80. Rotation of the twisting motor 54 is transmitted to the screw shaft 58 through the reduction gear mechanism 56. The twisting motor 54 is configured to rotate in a forward direction and in a reverse direction, in response to which the screw shaft 58 is also configured to rotate in a forward direction and a reverse direction. The sleeve 60 is arranged to surround a periphery of the screw shaft 58. In the state in which rotation of the sleeve 60 is prohibited, the sleeve 60 moves forward when the screw shaft 58 rotates in the forward direction, and the sleeve 60 moves rearward when the screw shaft 58 rotates in the reverse direction. The push plate 61 is configured to move integrally with the sleeve 60 in the front-rear direction in response to movement of the sleeve 60 in the front-rear direction. Further, when the screw shaft 58 rotates in the state in which the rotation of the sleeve 60 is permitted, the sleeve 60 rotates together with the screw shaft 58.

When the sleeve 60 advances to a predetermined position from its initial position, the push plate 61 drives the link 52 of the cutter mechanism 18 and rotates the cutter 40. The pair of hooks 62 is arranged at the front end of the sleeve 60, and is configured to open and close according to the position of the sleeve 60 in the front-rear direction. When the sleeve 60 moves forward, the pair of hooks 62 closes and grasps the wire W. After this, when the sleeve 60 moves rearward, the pair of hooks 62 opens and releases the wire W.

The controller 80 rotates the twisting motor 54 with the wire W wrapped around the rebars R. At this occasion, the rotation of the sleeve 60 is prohibited, and the sleeve 60 moves forward by the rotation of the screw shaft 58 and also the push plate 61 and the pair of hooks 62 thereby move forward, by which the pair of hooks 62 closes and grasps the wire W. Then, when the rotation of the sleeve 60 is permitted, the sleeve 60 rotates by the rotation of the screw shaft 58, and along with this the pair of hooks 62 rotates. Due to this, the wire W is twisted and the rebars R are thereby tied.

When twisting of the wire W is completed, the controller 80 rotates the twisting motor 54 in a reverse direction. At this occasion, the rotation of the sleeve 60 is prohibited, and after the pair of hooks 62 opens and the wire W is thereby released, the sleeve 60 moves rearward by the rotation of the screw shaft 58, and along with this the push plate 61 and the pair of hooks 62 also move rearward. Due to the sleeve 60 moving rearward, the push plate 61 drives the link 52 of the cutter mechanism 18, which returns the cutter 40 to its initial posture. After this, when the sleeve 60 moves back to the initial position, the rotation of the sleeve 60 is permitted, by which the sleeve 60 and the pair of hooks 62 rotate by the rotation of the screw shaft 58 and return to the initial angle.

As shown in FIG. 2, a first operation section 64 is arranged at an upper portion of the body 4. The first operation section 64 includes a main switch 74 configured to switch on/off of main power and a main power LED 76 that indicates an on/off state of the main power. The first operation section 64 is connected to the controller 80.

A second operation section 90 is arranged on a front upper surface of the battery receptacle 8. The user can set the number of turns of the wire W to be wrapped around the rebars R, a torque threshold for twisting the wire W, and the like through the second operation section 90. The second operation section 90 includes setting switches 98 for setting the number of turns of the wire W to be wrapped around the rebars R and the torque threshold for twisting the wire W and display LEDs 96 for displaying current settings. The second operation section 90 is connected to the controller 80.

As shown in FIGS. 2 to 5, with the rebar tying machine 2 detached from the rebar tying robot 100, the user uses the rebar tying machine 2 while holding the grip 6. A trigger 84 which can be pulled by the user is arranged at a front upper portion of the grip 6. As shown in FIG. 5, a trigger switch 86 configured to detect on/off of the trigger 84 is arranged inside the grip 6. The trigger switch 86 is connected to the controller 80. When the user pulls the trigger 84 and the trigger switch 86 thereby turns on, the rebar tying machine 2 performs a series of operations of wrapping the wire W around the rebars R by the feeder mechanism 12, the guide mechanism 14, and the brake mechanism 16, cutting the wire W and twisting the wire W wrapped on the rebars R by the cutter mechanism 18 and the twister mechanism 20.

(Configuration of Power Supply Unit 102)

As shown in FIG. 1, the power supply unit 102 is supported by the conveying unit 106. The power supply unit 102 includes a housing 110 and a cover 112. A control unit 126 is housed in the housing 110. The control unit 126 is configured to control operations of the power supply unit 102, the operation unit 104, and the conveying unit 106.

Figure 6:
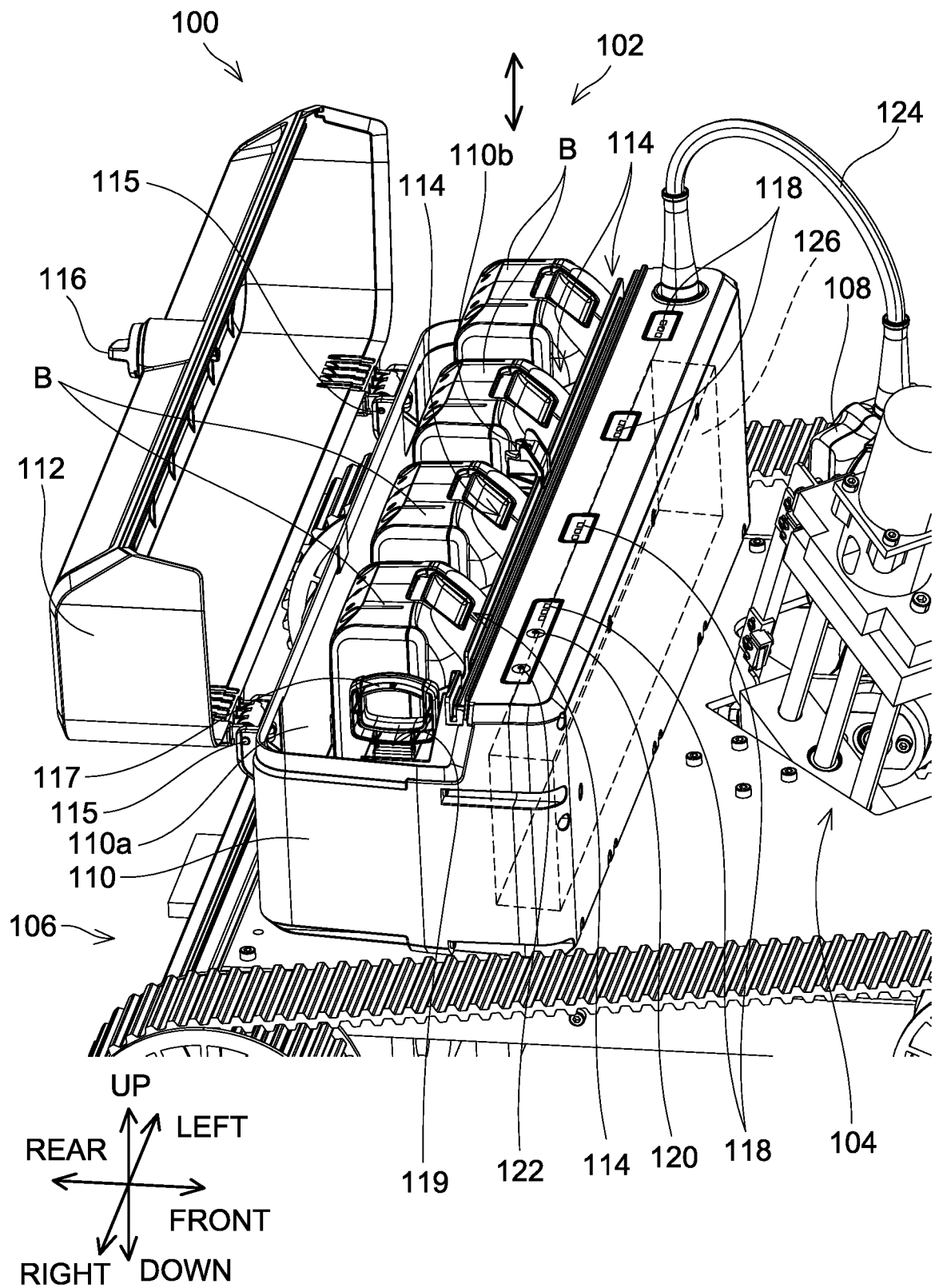
FIG. 6 is a perspective view of a power supply unit 102 of the rebar tying robot 100 of the embodiment viewed from the front right upper side with a cover 112 opened.

As shown in FIG. 6, a battery housing chamber 110a is defined in the housing 110. The battery housing chamber 110a includes a plurality of battery receptacles 114. One of a plurality of battery packs B can be detachably attached to each of the plurality of battery receptacles 114. The cover 112 is attached to the housing 110 via hinges 115 arranged at rear portions of the housing 110 in the vicinity of the upper end of the battery housing chamber 110a. The cover 112 is configured to pivot about a pivot axis extending in the left-right direction relative to the housing 110. As shown in FIG. 6, with the cover 112 opened relative to the housing 110, the plurality of battery packs B can be detachably attached to the plurality of battery receptacles 114 by sliding in the up-down direction. As shown in FIG. 1, when the cover 112 is closed relative to the housing 110, peripheries of the plurality of battery packs B attached to the plurality of battery receptacles 114 are surrounded by the housing 110 and the cover 112. In this state, the plurality of battery packs B inside the battery housing chamber 110a can be prevented from getting wet even when the power supply unit 102 gets wet with water.

The cover 112 is biased by a torsion spring that is not shown in a closing direction relative to the housing 110. A latch member 116 which the user can operate is arranged on the cover 112. As shown in FIG. 6, a latch receiver 110b corresponding to the latch member 116 is arranged on the housing 110. When the user closes the cover 112 and pivots the latch member 116, the latch member 116 engages with the latch receiver 110b, by which the cover 112 is maintained in the closed state relative to the housing 110. From this state, when the user pivots the latch member 116 in a reverse direction, engagement between the latch member 116 and the latch receiver 110b is released, and the user can thereby open the cover 112 relative to the housing 110.

A plurality of remaining charge indicators 118, a remaining charge display button 120, and an operation execution button 122 are arranged on an upper surface of the housing 110 on the front side of the battery housing chamber 110a. Each of the plurality of remaining charge indicators 118 is arranged corresponding to one of the plurality of battery receptacles 114, and is configured to display remaining charge in the battery pack B attached to its corresponding battery receptacle 114. The remaining charge display button 120 is a button for the user to switch on/off of display of the remaining charge on the plurality of remaining charge indicators 118. The operation execution button 122 is a button for the user to switch on/off of the operation of the rebar tying robot 100.

A power supply cable 124 is connected to the upper surface of the housing 110 on the front of the battery housing chamber 110a. The battery adapter 108 is connected to the power supply cable 124. With the battery adapter 108 attached to the rebar tying machine 2, power from the plurality of battery packs B is supplied to the rebar tying machine 2.

A key receptacle 119 to which a key 117 can be detachably attached is arranged in the battery housing chamber 110a. The key 117 can be attached or detached by being inserted into or withdrawn from the key receptacle 119. With the key 117 detached from the key receptacle 119, power supply from the plurality of battery packs B to the rebar tying machine 2, the operation unit 104, and the conveying unit 106 is cut off. With the key 117 attached to the key receptacle 119, the power supply from the plurality of battery packs B to the rebar tying machine 2, the operation unit 104, and the conveying unit 106 is permitted.

(Configuration of Operation Unit 104)

Figure 7:
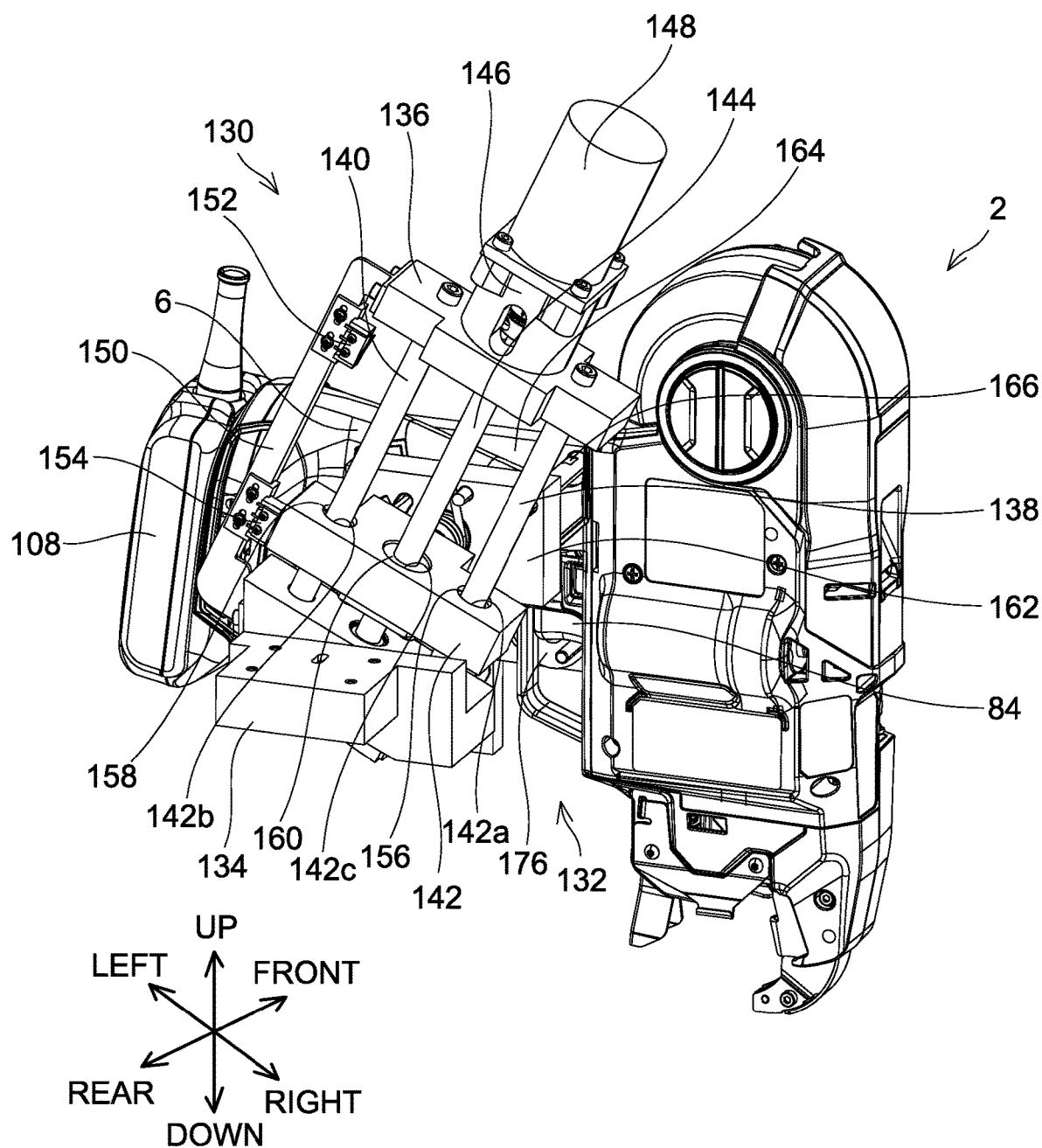
FIG. 7 is a perspective view of the rebar tying robot 100 of the embodiment viewed from the rear right upper side with the rebar tying machine 2 attached to an operation unit 104.
Figure 8:
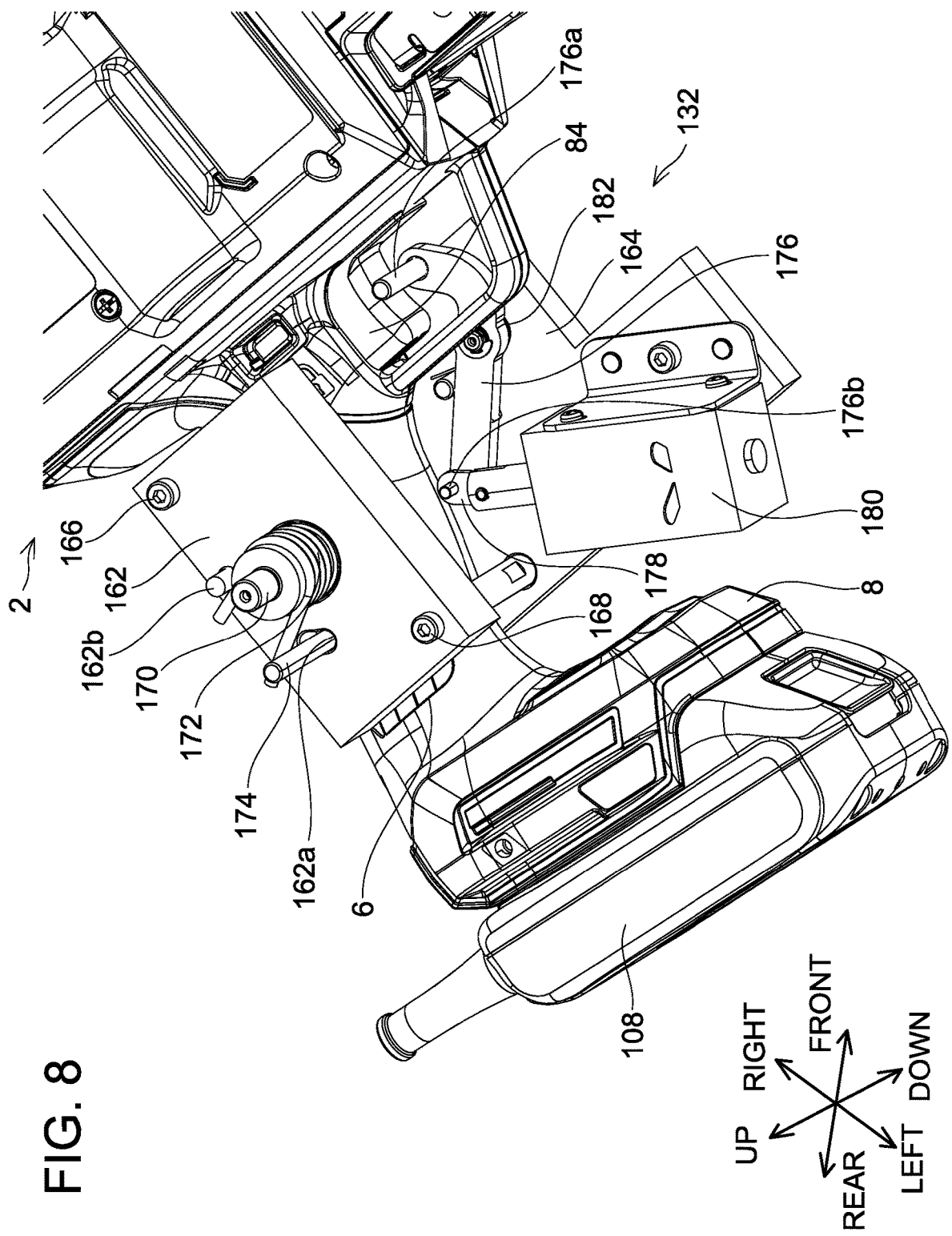
FIG. 8 is a perspective view of the rebar tying robot 100 of the embodiment viewed from the rear right lower side with the rebar tying machine 2 attached to a grip mechanism 132.

As shown in FIGS. 7 and 8, the operation unit 104 includes a lifter mechanism 130 and a grip mechanism 132.

As shown in FIG. 7, the lifter mechanism 130 includes a lower base member 134, an upper base member 136, support pipes 138, 140, a lifter 142, a screw shaft 144, a motor connector 146, a lift motor 148, a sensor supporting member 150, an upper limit detection sensor 152, and a lower limit detection sensor 154. The lower base member 134 is supported by the conveying unit 106. The lower ends of the support pipes 138, 140 are fixed to the lower base member 134. The upper ends of the support pipes 138, 140 are fixed to the upper base member 136. The support pipes 138, 140 are arranged parallel to each other. The support pipes 138, 140 are arranged such that they are inclined in both the front-rear direction and the left-right direction with respect to the up-down direction of the rebar tying robot 100. Hereinbelow, a direction along which the support pipes 138, 140 extend may be termed a lifting direction. Through holes 142a, 142b through which the support pipes 138, 140 penetrate are defined in the lifter 142. Retaining members 156, 158 configured to slidably retain the support pipes 138, 140 are fixed to the through holes 142a. 142b. The retaining members 156, 158 may for example be linear bushes in which solid lubricant is embedded, linear ball bearings, or oilless bearings. The lifter 142 is arranged between the lower base member 134 and the upper base member 136 in the state in which each of the support pipes 138, 140 is slidably penetrating a corresponding one of the retaining members 156, 158. The screw shaft 144 is arranged between the support pipes 138, 140. The lower end of the screw shaft 144 is rotatably supported by the lower base member 134. The vicinity of the upper end of the screw shaft 144 is rotatably supported by the upper base member 136. The screw shaft 144 is arranged parallel to the support pipes 138, 140. An external thread is defined on an outer surface of the screw shaft 144 at a portion between the lower base member 134 and the upper base member 136. The lifter 142 includes a through hole 142c through which the screw shaft 144 penetrates. A nut 160 is fixed to the through hole 142c. An internal thread corresponding to the external thread of the screw shaft 144 is defined on the nut 160. The screw shaft 144 penetrates the lifter 142 with its external thread screw-fitted with the internal thread of the nut 160. The upper end of the screw shaft 144 is coupled to the lift motor 148 via the motor connector 146. The lift motor 148 may for example be a DC brush motor. When the lift motor 148 rotates in a forward direction, the lifter 142 is lowered in a direction from the upper base member 136 toward the lower base member 134 by rotation of the screw shaft 144. On the other hand, when the lift motor 148 rotates in a reverse direction, the lifter 142 is lifted in a direction from the lower base member 134 toward the upper base member 136 by rotation of the screw shaft 144. The sensor supporting member 150 has its lower end fixed to the lower base member 134 and its upper end fixed to the upper base member 136. Each of the upper limit detection sensor 152 and the lower limit detection sensor 154 is fixed to the sensor supporting member 150. The upper limit detection sensor 152 is normally off, and turns on by contacting the lifter 142 when the lifter 142 reaches an upper limit position. The lower limit detection sensor 154 is normally off, and turns on by contacting the lifter 142 when the lifter 142 reaches a lower limit position. When the rebar tying machine 2 is to be lowered, the control unit 126 of the rebar tying robot 100 rotates the lift motor 148 in the forward direction, and stops the lift motor 148 when the lower limit detection sensor 154 turns on. The control unit 126 also stops the lift motor 148 in the case in which the rebar tying machine 2 collides with the first rebars R1, the second rebars R2, or other obstacles when the rebar tying machine 2 is lowered and a load applied to the lift motor 148 thereby increases abruptly. The load applied to the lift motor 148 may be identified for example from a current value of the lift motor 148. When the rebar tying machine 2 is to be lifted, the control unit 126 rotates the lift motor 148 in the reverse direction and stops the lift motor 148 when the upper limit detection sensor 152 turns on.

Figure 9:
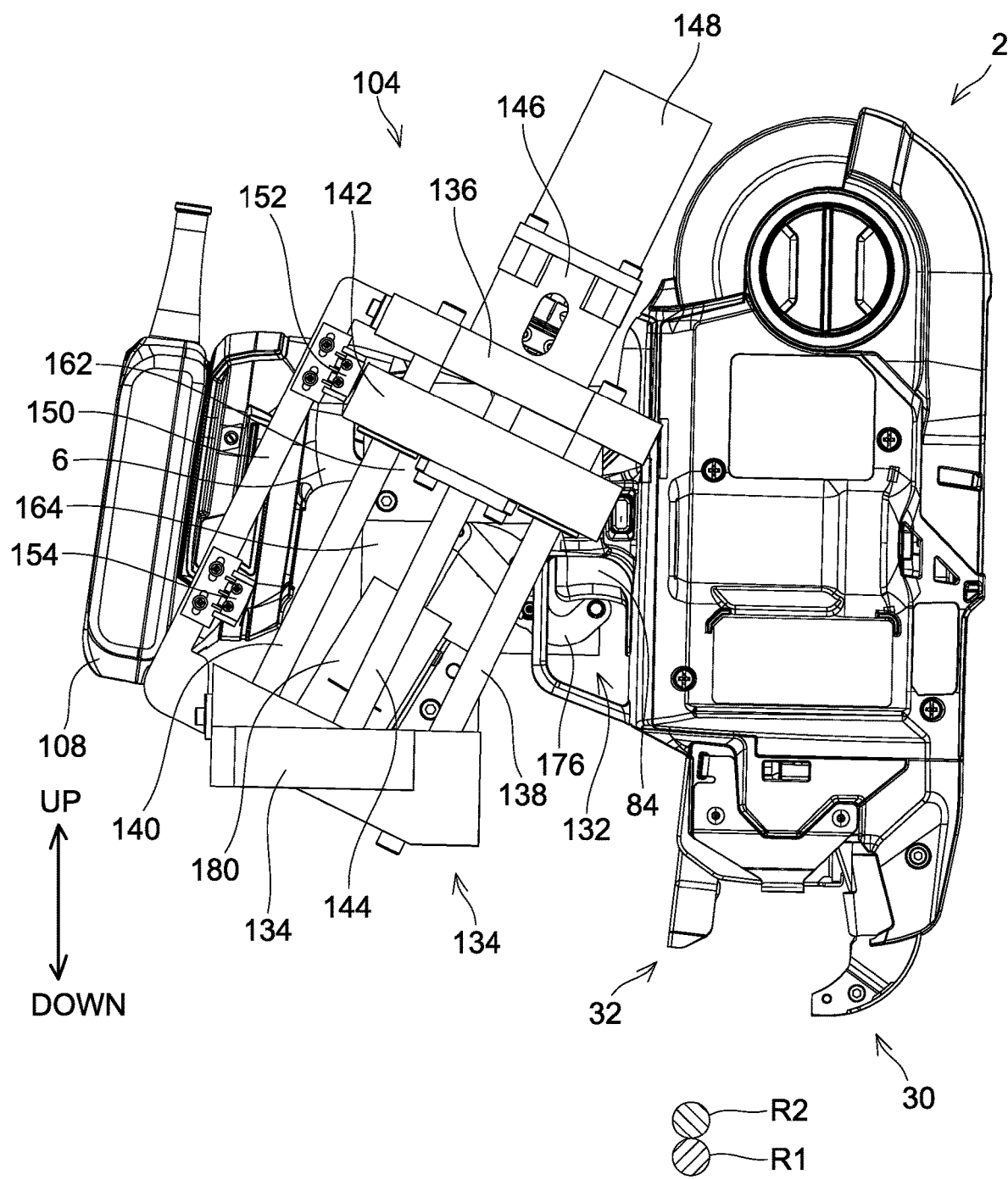
FIG. 9 is a side view of an operation unit 104 and the rebar tying machine 2 of the rebar tying robot 100 of the embodiment with the rebar tying machine 2 lifted.
Figure 10:
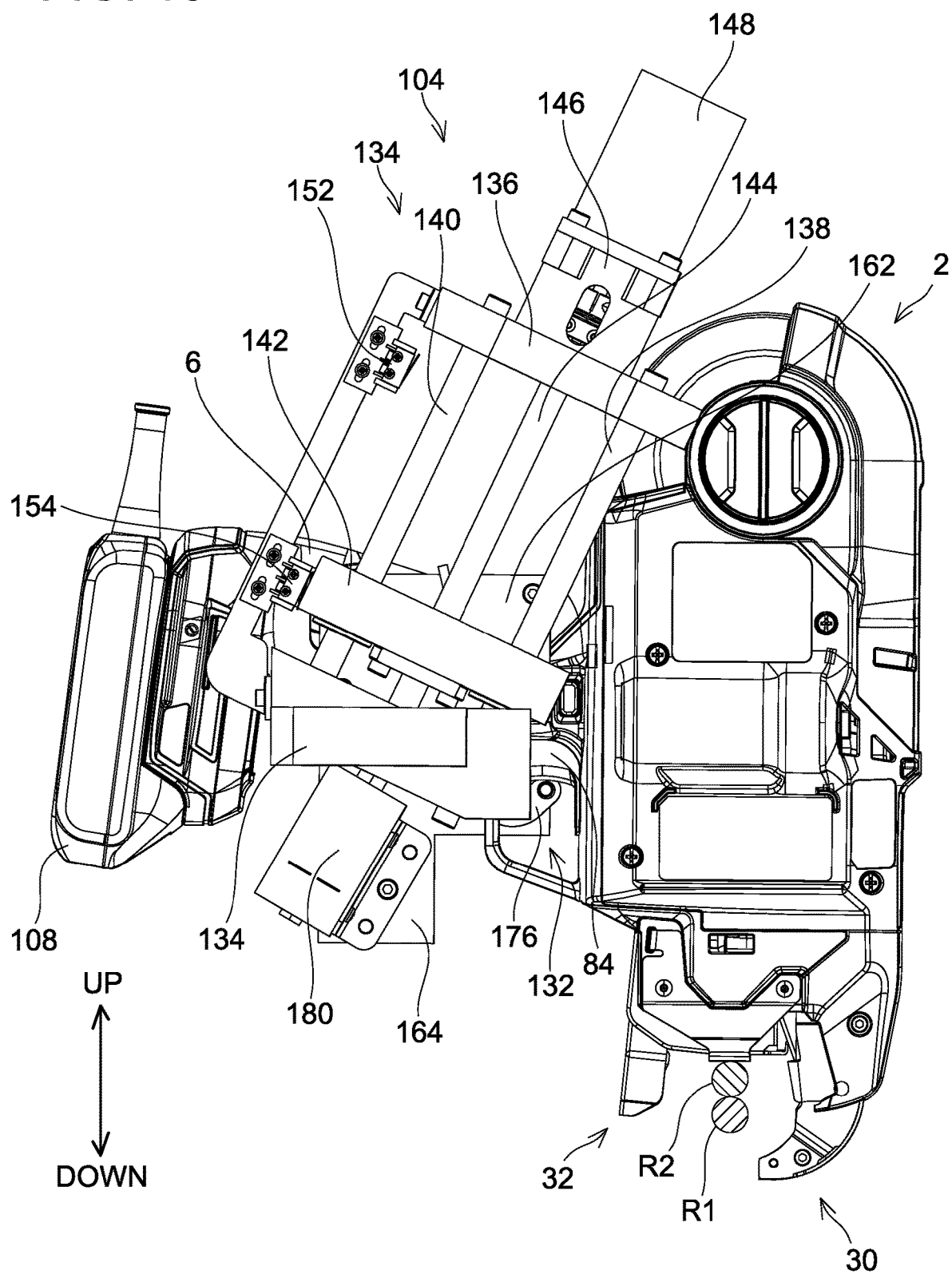
FIG. 10 is a side view of the operation unit 104 and the rebar tying machine 2 of the rebar tying robot 100 of the embodiment with the rebar tying machine 2 lowered.

As shown in FIGS. 9 and 10, in the rebar tying robot 100 of the present embodiment, when the rebar tying machine 2 is lowered, the first rebar R1 and the second rebar R2 become closer to the rebar tying machine 2 at positions closer to the lower curl guide 32 than to the upper curl guide 30. Due to this, in lowering the rebar tying machine 2, the first rebar R1 and the second rebar R2 can be suppressed from colliding with the upper curl guide 30. Further, in the rebar tying robot 100 of the present embodiment, when the rebar tying machine 2 is lifted, the first rebar R1 and the second rebar R2 become distant from the rebar tying machine 2 toward positions closer to the lower curl guide 32 than to the upper curl guide 30. Due to this, in lifting the rebar tying machine 2, the first rebar R1 and the second rebar R2 can be suppressed from being caught on the upper curl guide 30.

As shown in FIG. 8, the grip mechanism 132 includes a first support plate 162, a second support plate 164, coupling shafts 166, 168, a pivot pin 170, a torsion spring 172, a support pin 174, a link 176, a plunger 178, an actuator 180, and a torsion spring 182. The first support plate 162 is arranged facing one outer surface of the grip 6 of the rebar tying machine 2 (such as a right outer surface as viewed from the rebar tying machine 2). The second support plate 164 is arranged facing the other outer surface of the grip 6 of the rebar tying machine 2 (such as a left outer surface as viewed from the rebar tying machine 2). The first support plate 162 and the second support plate 164 are fixed to each other via the coupling shafts 166, 168 while holding the grip 6 of the rebar tying machine 2 between them. A surface of the first support plate 162 facing the grip 6 and a surface of the second support plate 164 facing the grip 6 each have a plurality of protrusions (not shown) defined thereon that is to fit with a plurality of recesses 6a (see FIG. 2) defined on a corresponding outer surface of the grip 6 of the rebar tying machine 2. Due to this, a position of the grip 6 of the rebar tying machine 2 is fixed relative to the first support plate 162 and the second support plate 164.

The first support plate 162 is coupled to the lifter 142 of the lifter mechanism 130 via the pivot pin 170. One end of the pivot pin 170 is fixed to the lifter 142. The other end of the pivot pin 170 is pivotably supported by the first support plate 162. Due to this, the rebar tying machine 2 supported by the first support plate 162 and the second support plate 164 can be lifted or lowered according to lifting or lowering motion of the lifter 142 and can pivot about the pivot pin 170 relative to the lifter 142. The support pin 174 is fixed to the lifter 142 and extends from the lifter 142 toward the first support plate 162. The first support plate 162 includes a long hole 162a through which the support pin 174 is to be inserted and a protrusion 162b protruding toward the lifter 142. The long hole 162a defines a pivoting range for the rebar tying machine 2 to pivot about the pivot pin 170. The torsion spring 172 is arranged outside the pivot pin 170 and biases the protrusion 162b relative to the support pin 174 in a direction along which the protrusion 162b separates away from the support pin 174 (that is, biases the first support plate 162 relative to the lifter 142). If the rebar tying machine 2 is configured such that it cannot pivot relative to the lifter 142, a large impact acts on the operation unit 104 when an obstacle collides with the rebar tying machine 2. By configuring the rebar tying machine 2 as above to be pivotable relative to the lifter 142, such a large impact can be suppressed from acting on the operation unit 104 when the rebar tying machine 2 collides with an obstacle.

The link 176 is supported by the second support plate 164. The link 176 is pivotable relative to the second support plate 164 about a pivot axis extending along the left-right direction. The link 176 includes a presser portion 176a and an operation portion 176b. The presser portion 176a is arranged facing the trigger 84 of the rebar tying machine 2. The operation portion 176b is coupled to the actuator 180 via the plunger 178. The actuator 180 may for example be a solenoid. An operation of the actuator 180 is controlled by the control unit 126 of the rebar tying robot 100. The torsion spring 182 biases the link 176 relative to the second support plate 164 in a direction along which the presser portion 176a separates away from the trigger 84. When the actuator 180 is off, the presser portion 176a is separated away from the trigger 84 by a biasing force of the torsion spring 182. When the actuator 180 turns on, the link 176 pivots in a direction by which the operation portion 176b approaches toward the actuator 180, and the presser portion 176a thereby presses the trigger 84. Due to this, the operation of pulling the trigger 84 of the rebar tying machine 2 is carried out.

(Configuration of Conveying Unit 106)

Figure 11:
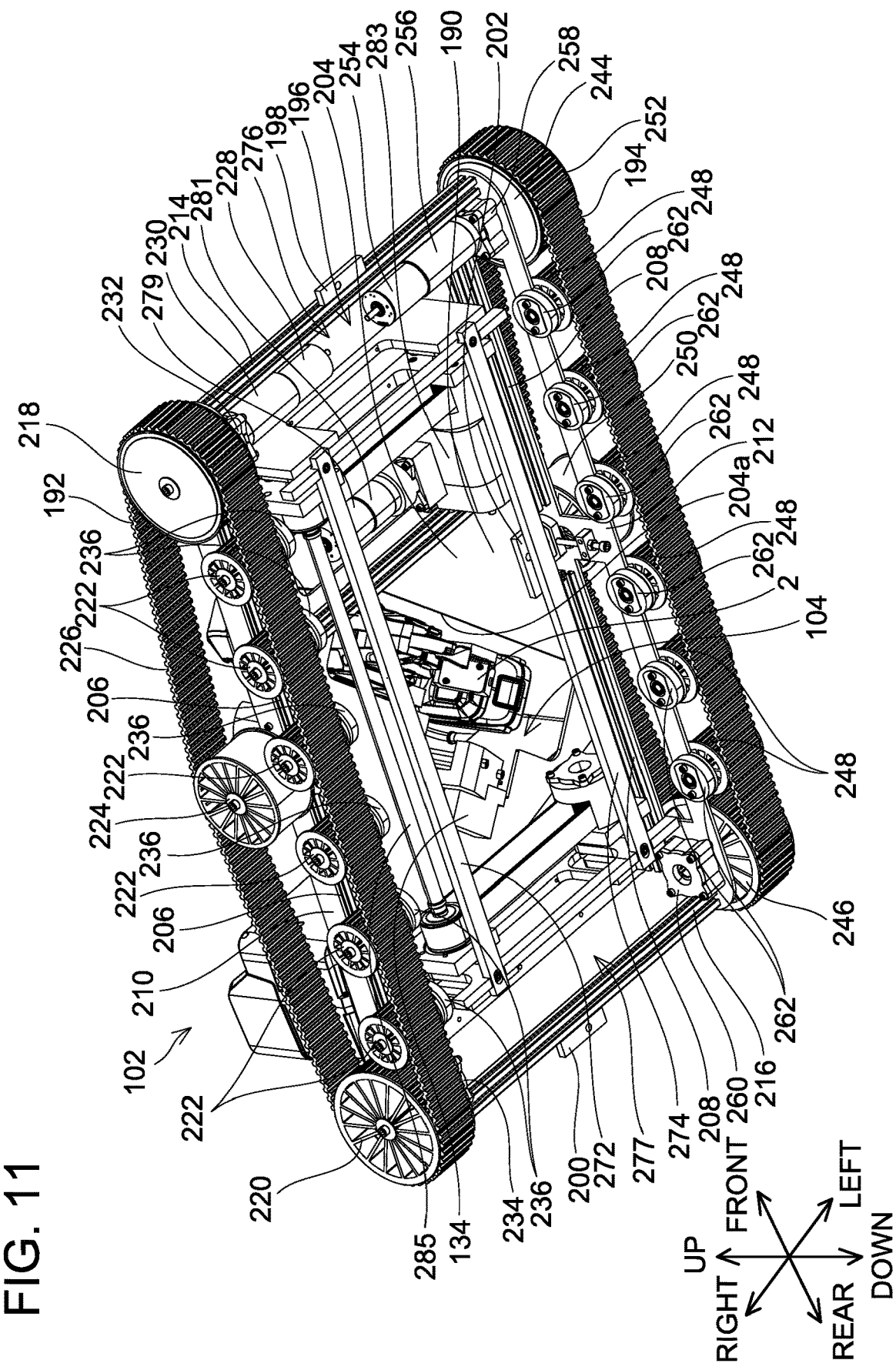
FIG. 11 is a perspective view of the rebar tying robot 100 of the embodiment viewed from the front right lower side.

As shown in FIG. 11, the conveying unit 106 includes a carrier 190, a right crawler 192, a left crawler 194, a side stepper 196, and rebar detection sensors 198, 200, 202.

The carrier 190 includes a base plate 204, a right frame 206, a left frame 208, a right plate 210, a left plate 212, a from frame 214, and a rear frame 216. The base plate 204 is arranged along the front-rear direction and the left-right direction. As shown in FIG. 1, the power supply unit 102 is supported by the conveying unit 106 by having the housing 110 fixed to an upper surface of the base plate 204. A through hole 204a is defined in the base plate 204. As shown in FIG. 11, the operation unit 104 is supported by the conveying unit 106 by fixing the lower base member 134 to an edge of the through hole 204a. When the operation unit 104 is to lift or lower the rebar tying machine 2, the rebar tying machine 2 moves through the through hole 204a.

The right frame 206 and the left frame 208 are fixed to a lower surface of the base plate 204. The right frame 206 extends in the front-rear direction at the right end of the base plate 204. The left frame 208 extends in the front-rear direction at the left end of the base plate 204. In the front-rear direction, the front end of the right frame 206 and the front end of the left frame 208 are located at the same position as the front end of the base plate 204, and the rear end of the right frame 206 and the rear end of the left frame 208 are located at the same position as the rear end of the base plate 204. The right plate 210 is fixed to a right surface of the right frame 206. The right plate 210 is arranged along the front-rear direction and the up-down direction. The left plate 212 is fixed to a left surface of the left frame 208. The left plate 212 is arranged along the front-rear direction and the up-down direction. In the up-down direction, the upper end of the right plate 210 and the upper end of the left plate 212 are located at the same position as the upper surface of the base plate 204. In the front-rear direction, the front end of the right plate 210 and the front end of the left plate 212 protrude frontward beyond the front end of the base plate 204, and the rear end of the right plate 210 and the rear end of the left plate 212 protrude rearward beyond the rear end of the base plate 204. The front frame 214 couples a portion of the right plate 210 at the vicinity of its front end and a portion of the left plate 212 at the vicinity of its front end at a position on the front side of the front end of the base plate 204. The rear frame 216 couples a portion of the right plate 210 at the vicinity of the rear end and a portion of the left plate 212 at the vicinity of the rear end at a position on the rear side of the rear end of the base plate 204. The front frame 214 and the rear frame 216 extend in the left-right direction. In the up-down direction, the front frame 214 and the rear frame 216 are positioned lower than the right frame 206 and the left frame 208.

The right crawler 192 includes a front pulley 218, a rear pulley 220, a plurality of auxiliary pulleys 222, a tensioner pulley 224, a rubber belt 226, a right crawler motor 228, and a gearbox 230. Teeth configured to mesh with the rubber belt 226 are defined on an outer surface of the front pulley 218, an outer surface of the rear pulley 220, and outer surfaces of the plurality of auxiliary pulleys 222. The rubber belt 226 is looped around each of the front pulley 218, the rear pulley 220, the plurality of auxiliary pulleys 222, and the tensioner pulley 224. The front pulley 218 is rotatably supported by the right plate 210 via a bearing 232 in the vicinity of the front end of the right plate 210. The rear pulley 220 is rotatably supported by the right plate 210 via a bearing 234 in the vicinity of the rear end of the right plate 210. The plurality of auxiliary pulleys 222 is rotatably supported by the right plate 210 via bearings 236 between the front pulley 218 and the rear pulley 220. The plurality of auxiliary pulleys 222 is arranged along the front-rear direction. An outer diameter of the front pulley 218 and an outer diameter of the rear pulley 220 are substantially the same, and an outer diameter of each of the plurality of auxiliary pulleys 222 is smaller than the outer diameters of the front pulley 218 and the rear pulley 220. In the up-down direction, the lower end of the front pulley 218, the lower end of the rear pulley 220, and the lower ends of the plurality of auxiliary pulleys 222 are located at the substantially same position.

Figure 12:
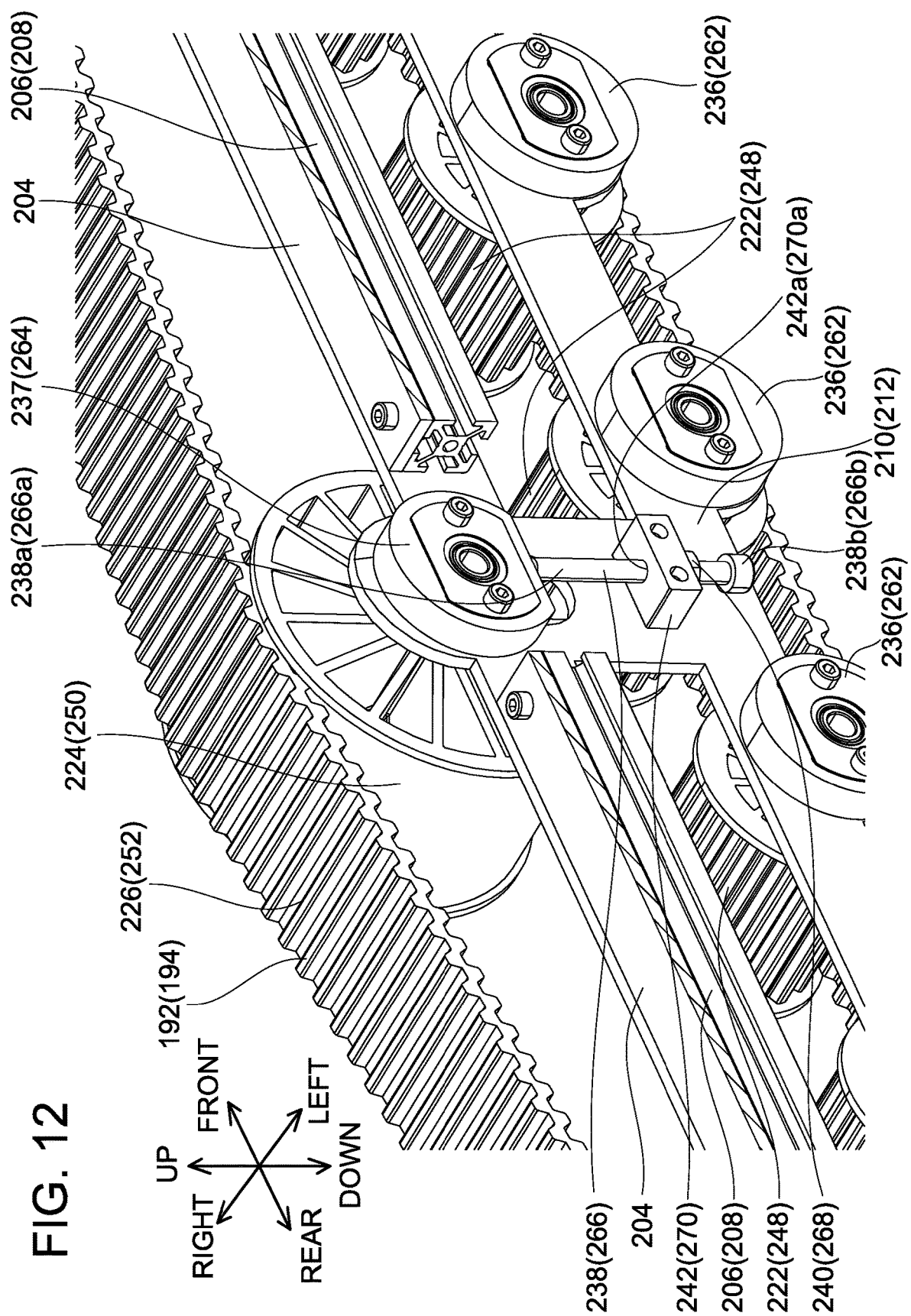
FIG. 12 is a perspective cross-sectional view of a tensioner pulley 224 of the rebar tying robot 100 of the embodiment and its surroundings from front left upper side.

As shown in FIG. 12, the tensioner pulley 224 is rotatably supported by a movable bearing 237. The movable bearing 237 is supported by the right plate 210 such that the movable bearing 237 can move in the up-down direction. The base plate 204 and the right frame 206 are cut away in the vicinity of the movable bearing 237 so that they do not interfere with the movable bearing 237. An adjustment bolt 238, a nut 240, and a bolt supporting member 242 are arranged below the movable bearing 237. The bolt supporting member 242 is fixed to the right plate 210. A through hole 242a through which a shank 238a of the adjustment bolt 238 penetrates is defined in the bolt supporting member 242. An internal thread corresponding to an external thread on the shank 238a is defined on an inner surface of the through hole 242a. The nut 240 is arranged below the bolt supporting member 242. A head 238b of the adjustment bolt 238 is arranged below the nut 240, and the shank 238a of the adjustment bolt 238 is screw-fitted with the nut 240 and with the through hole 242a of the bolt supporting member 242. Due to this, a position of the adjustment bolt 238 in the up-down direction is fixed by a so-called double nut structure. The upper end of the shank 238a of the adjustment bolt 238 abuts a lower surface of the movable bearing 237. By adjusting the position of the adjustment bolt 238 in the up-down direction with the rubber belt 226 looped around each of the tensioner pulley 224, a position of the movable bearing 237 relative to the right plate 210 in the up-down direction can be adjusted. Due to this, a degree of tension of the rubber belt 226 can be adjusted.

As shown in FIG. 11, the right crawler motor 228 is supported by the right plate 210 via the bearing 232 and the gearbox 230. The right crawler motor 228 may for example be a DC brushless motor. The right crawler motor 228 is coupled to the front pulley 218 via a reduction gear (not shown) incorporated in the gearbox 230. When the right crawler motor 228 rotates in a forward direction or a reverse direction, the front pulley 218 rotates in a forward direction or a reverse direction, by which the rubber belt 226 rotates in a forward direction or a reverse direction on the outside of the front pulley 218, the rear pulley 220, the plurality of auxiliary pulleys 222, and the tensioner pulley 224.

The left crawler 194 includes a front pulley 244, a rear pulley 246, a plurality of auxiliary pulleys 248, a tensioner pulley 250, a rubber belt 252, a left crawler motor 254, and a gearbox 256. Teeth configured to mesh with the rubber belt 252 are defined on an outer surface of the front pulley 244, an outer surface of the rear pulley 246, and outer surfaces of the plurality of auxiliary pulleys 248. The rubber belt 252 is looped around each of the front pulley 244, the rear pulley 246, the plurality of auxiliary pulleys 248, and the tensioner pulley 250. The front pulley 244 is rotatably supported by the left plate 212 via a bearing 258 in the vicinity of the front end of the left plate 212. The rear pulley 246 is rotatably supported by the left plate 212 via a bearing 260 in the vicinity of the rear end of the left plate 212. The plurality of auxiliary pulleys 248 is rotatably supported by the left plate 212 via their corresponding bearings 262 between the front pulley 244 and the rear pulley 246. The plurality of auxiliary pulleys 248 is arranged along the front-rear direction. An outer diameter of the front pulley 244 and an outer diameter of the rear pulley 246 are substantially the same, and an outer diameter of each of the plurality of auxiliary pulleys 248 is smaller than the outer diameters of the front pulley 244 and the rear pulley 246. In the up-down direction, the lower end of the front pulley 244, the lower end of the rear pulley 246, and the lower ends of the plurality of auxiliary pulleys 248 are located at a substantially same position.

As shown in FIG. 12, the tensioner pulley 250 is rotatably supported by a movable bearing 264. The movable bearing 264 is supported by the left plate 212 such that the movable bearing 264 can move in the up-down direction. The base plate 204 and the left frame 208 are cut away in the vicinity of the movable bearing 264 so that they do not interfere with the movable bearing 264. An adjustment bolt 266, a nut 268, and a bolt supporting member 270 are arranged below the movable bearing 264. The bolt supporting member 270 is fixed to the left plate 212. A through hole 270a through which a shank 266a of the adjustment bolt 266 penetrates is defined in the bolt supporting member 270. An internal thread corresponding to an external thread on the shank 266a is defined on an inner surface of the through hole 270a. The nut 268 is arranged below the bolt supporting member 270. A head 266b of the adjustment bolt 266 is arranged below the nut 268, and the shank 266a of the adjustment bolt 266 is screw-fitted with the nut 268 and with the through hole 270a of the bolt supporting member 270. Due to this, a position of the adjustment bolt 266 in the up-down direction is fixed by a so-called double nut structure. The upper end of the shank 266a of the adjustment bolt 266 abuts a lower surface of the movable bearing 264. By adjusting the position of the adjustment bolt 266 in the up-down direction with the rubber belt 252 looped around each of the tensioner pulley 250, a position of the movable bearing 264 relative to the left plate 212 in the up-down direction can be adjusted. Due to this, a degree of tension of the rubber belt 252 can be adjusted.

As shown in FIG. 11, the left crawler motor 254 is supported by the left plate 212 via the bearing 258 and the gearbox 256. The left crawler motor 254 may for example be a DC brushless motor. The left crawler motor 254 is coupled to the front pulley 244 via a reduction gear (not shown) incorporated in the gearbox 256. When the left crawler motor 254 rotates in a forward direction or a reverse direction, the front pulley 244 rotates in a forward direction or a reverse direction, by which the rubber belt 252 rotates in a forward direction or a reverse direction on the outside of the front pulley 244, the rear pulley 246, the plurality of auxiliary pulleys 248, and the tensioner pulley 250.

Figure 13:
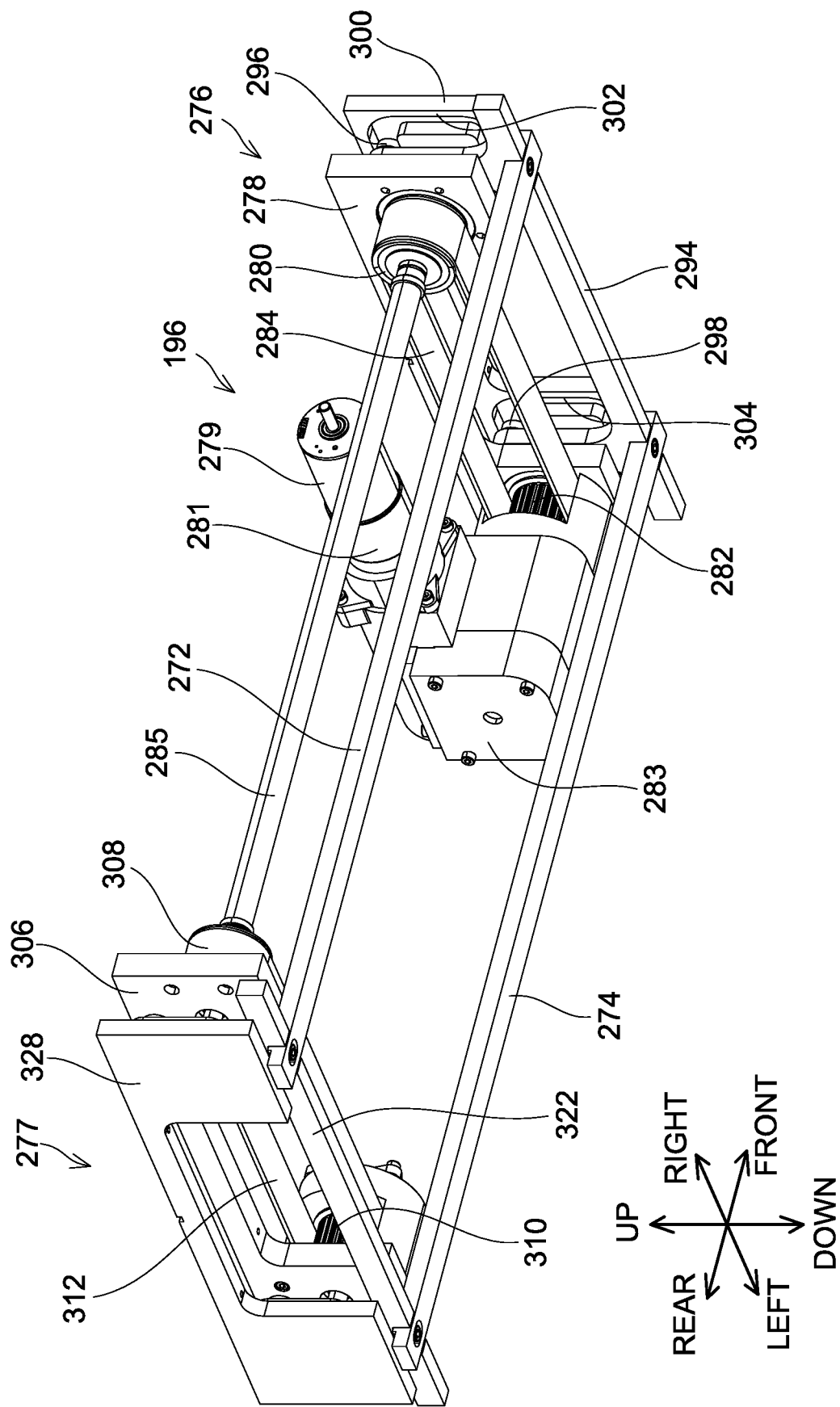
FIG. 13 is a perspective view of a side stepper 196 of the rebar tying robot 100 of the embodiment viewed from the rear right lower side.

As shown in FIG. 13, the side stepper 196 includes step bars 272, 274, a front crank mechanism 276, a rear crank mechanism 277, a stepper motor 279, a gearbox 281, a worm gear casing 283, and a rotation transmitting shaft 285. The step bars 272, 274 are bar-shaped members with a substantially rectangular cross section, and extend in the front-rear direction. As shown in FIG. 11, in the left-right direction, the step bar 272 is arranged between the center and the right end of the base plate 204, and the step bar 274 is arranged between the center and the left end of the base plate 204.

Figure 14:
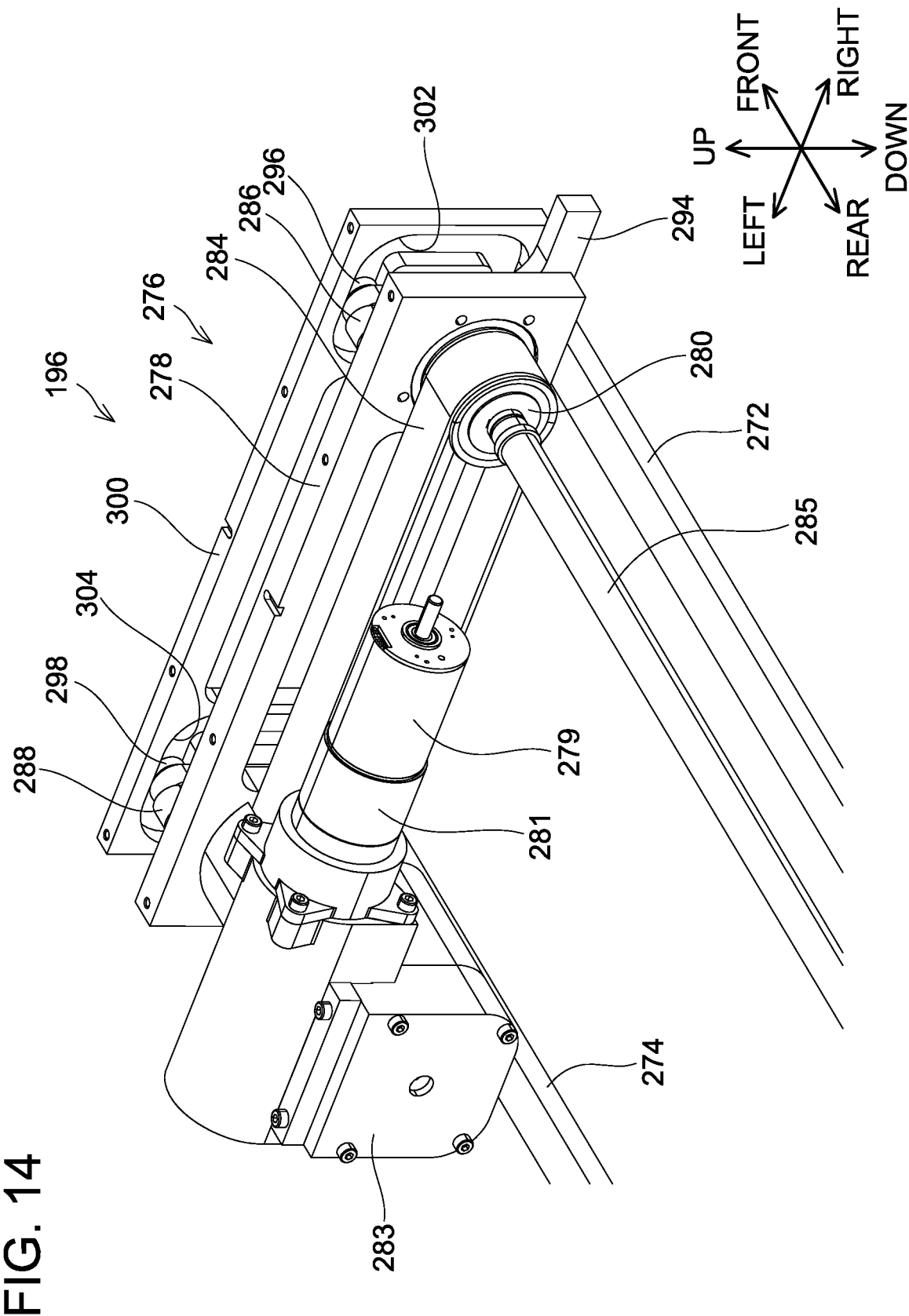
FIG. 14 is a perspective view of a front part of the side stepper 196 of the rebar tying robot 100 of the embodiment viewed from the rear right upper side.

As shown in FIGS. 13 and 14, the front crank mechanism 276 includes a support plate 278, pulleys 280, 282, a belt 284, crank arms 286, 288, crank pins 290, 292 (see FIG. 15), a crank plate 294, rollers 296, 298, and a guide plate 300. The support plate 278 is fixed to the lower surface of the base plate 204 in the vicinity of the front end of the base plate 204. The support plate 278 is arranged along the left-right direction and the up-down direction. The pulley 280 is arranged on the rear side of the support plate 278 in the vicinity of the right end of the support plate 278. The pulley 282 is arranged on the rear side of the support plate 278 in the vicinity of the left end of the support plate 278. The pulleys 280, 282 are supported rotatably by the support plate 278. A diameter of the pulley 280 is substantially the same as a diameter of the pulley 282. The belt 284 is looped around each of the pulleys 280, 282. Due to this, when one of the pulleys 280, 282 rotates in a forward direction or a reverse direction, the other thereof rotates in the forward direction or the reverse direction at substantially the same rotational speed.

Figure 15:
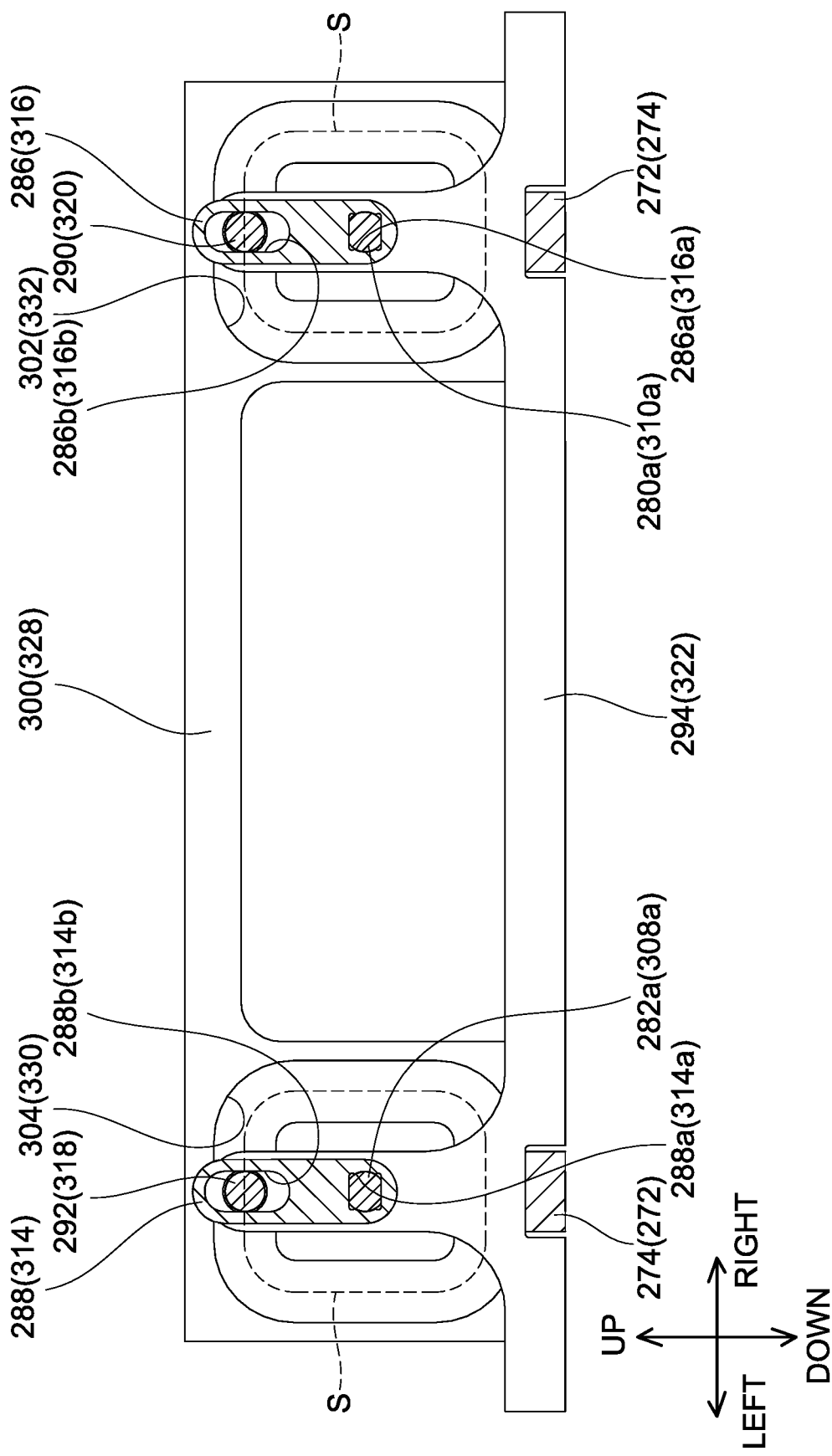
FIG. 15 is a cross-sectional view of a front crank mechanism 276 of the rebar tying robot 100 of the embodiment viewed from the rear side.

The crank arms 286, 288, the crank pins 290, 292, the crank plate 294, the rollers 296, 298, and the guide plate 300 are arranged on the front side of the support plate 278. As shown in FIG. 15, the crank arms 286, 288 include fitting holes 286a, 288a to which shafts 280a, 282a of the pulleys 280, 282 are fitted, and long holes 286b, 288b extending in a longitudinal direction of the crank arms 286, 288. When the pulleys 280, 282 rotate, the crank arms 286, 288 rotate integrally with the pulleys 280, 282 about the shafts 280a, 282a. The crank pins 290, 292 are slidably inserted into the long holes 286b, 288b. The crank pins 290, 292 are fixed to the crank plate 294 with the crank pins 290, 292 penetrating the crank plate 294. The crank plate 294 is arranged on the front side of the crank arms 286, 288. The crank plate 294 extends in the left-right direction and the up-down direction. The rollers 296, 298 (see FIG. 14) are attached to the crank pins 290, 292 on the front side of the crank plate 294. As shown in FIG. 14, the rollers 296, 298 are accommodated in guide grooves 302, 304 defined in a rear surface of the guide plate 300. The guide plate 300 is fixed to the lower surface of the base plate 204 on the front side of the crank plate 294. The guide plate 300 extends in the left-right direction and the up-down direction. As shown in FIG. 15, the guide grooves 302, 304 of the guide plate 300 have substantially rectangular shapes with rounded corners. The guide grooves 302, 304 define a side-stepping track S shown by broken lines in FIG. 15. The side-stepping track S has a substantially rectangular shape with rounded corners, and includes upper and lower edges extending along the left-right direction, and right and left edges extending along the up-down direction.

In the front crank mechanism 276, when the pulleys 280, 282 rotate, the crank pins 290, 292 move in a rotating direction of the crank arms 286, 288 by rotation of the crank arms 286, 288. Here, since the rollers 296, 298 are accommodated in the guide grooves 302, 304, the crank pins 290, 292 move along the side-stepping track S defined by the guide grooves 302, 304 while sliding inside the long holes 286b, 288b. Due to this, the crank plate 294 to which the crank pins 290, 292 are fixed also moves along the side-stepping track S defined by the guide grooves 302, 304.

Figure 16:
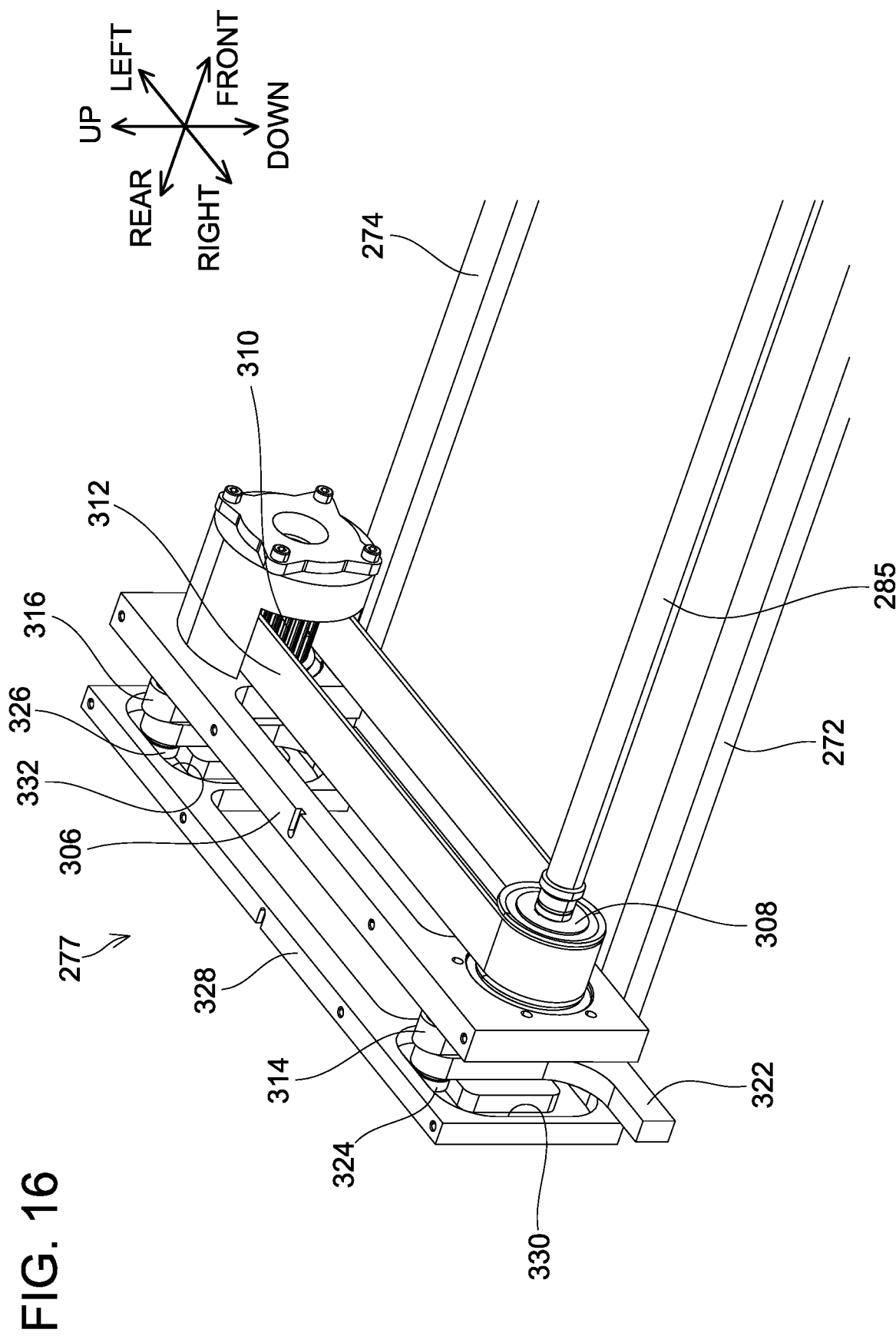
FIG. 16 is a perspective view of a rear part of the side stepper 196 of the rebar tying robot 100 of the embodiment viewed from the front right upper side.

As shown in FIG. 16, the rear crank mechanism 277 includes a support plate 306, pulleys 308, 310, a belt 312, crank arms 314, 316, crank pins 318, 320 (see FIG. 15), a crank plate 322, rollers 324, 326, and a guide plate 328. The support plate 306 is fixed to the lower surface of the base plate 204 in the vicinity of the rear end of the base plate 204. The support plate 306 is arranged along the left-right direction and the up-down direction. The pulley 308 is arranged on the front side of the support plate 306 in the vicinity of the right end of the support plate 306. The pulley 310 is arranged on the front side of the support plate 306 in the vicinity of the left end of the support plate 306. The pulleys 308, 310 are supported rotatably by the support plate 306. A diameter of the pulley 308 is substantially the same as a diameter of the pulley 310, and is substantially the same as the diameter of each of the pulleys 280, 282 of the front crank mechanism 276. The belt 312 is looped around each of the pulleys 308, 310. Due to this, when one of the pulleys 308, 310 rotates in a forward direction or a reverse direction, the other thereof rotates in the forward direction or the reverse direction at substantially the same rotational speed.

The crank arms 314, 316, the crank pins 318, 320, the crank plate 322, the rollers 324, 326, and the guide plate 328 are arranged on the rear side of the support plate 306. As shown in FIG. 15, the crank arms 314, 316 include fitting holes 314a, 316a to which shafts 308a, 310a of the pulleys 308, 310 are fitted, and long holes 314b, 316b extending in a longitudinal direction of the crank arms 314, 316. When the pulleys 308, 310 rotate, the crank arms 314, 316 rotate integrally with the pulleys 308, 310 about the shafts 308a, 310a. The crank pins 318, 320 are slidably inserted into the long holes 314b, 316b. The crank pins 318, 320 are fixed to the crank plate 322 with the crank pins 318, 320 penetrating the crank plate 322. The crank plate 322 is arranged on the rear side of the crank arms 314, 316. The crank plate 322 extends in the left-right direction and the up-down direction. The rollers 324, 326 (see FIG. 16) are attached to the crank pins 318, 320 on the rear side of the crank plate 322. As shown in FIG. 16, the rollers 324, 326 are accommodated in guide grooves 330, 332 defined in a front surface of the guide plate 328. The guide plate 328 is fixed to the lower surface of the base plate 204 on the rear side of the crank plate 322. The guide plate 328 extends in the left-right direction and the up-down direction. As shown in FIG. 15, the guide grooves 330, 332 of the guide plate 328 have substantially rectangular shapes with rounded corners. The guide grooves 330, 332 define a side-stepping track S shown by broken lines in FIG. 15. The side-stepping track S has a substantially rectangular shape with rounded corners, and includes upper and lower edges extending along the left-right direction, and right and left edges extending along the up-down direction. The side-stepping track S defined by the guide grooves 330, 332 is the same as the side-stepping track S defined by the guide grooves 302, 304.

In the rear crank mechanism 277, when the pulleys 308, 310 rotate, the crank pins 318, 320 move in a rotating direction of the crank arms 314, 316 by rotation of the crank arms 314, 316. Here, since the rollers 324, 326 are accommodated in the guide grooves 330, 332, the crank pins 318, 320 move along the side-stepping track S defined by the guide grooves 330, 332 while sliding inside the long holes 314b, 316b. Due to this, the crank plate 322 to which the crank pins 318, 320 are fixed also moves along the side-stepping track S defined by the guide grooves 302, 304.

As shown in FIG. 13, the step bars 272, 274 have front ends fixed to the crank plate 294 of the front crank mechanism 276, and rear ends fixed to the crank plate 322 of the rear crank mechanism 277. Further, the pulley 280 of the front crank mechanism 276 and the pulley 308 of the rear crank mechanism 277 are coupled by the rotation transmitting shaft 285. Due to this, the pulleys 280, 282 of the front crank mechanism 276 and the pulleys 308, 310 of the rear crank mechanism 277 rotate in synchrony with each other, and the crank plate 294 of the front crank mechanism 276 and the crank plate 322 of the rear crank mechanism 277 operate in synchrony. One of the front crank mechanism 276 and the rear crank mechanism 277 (such as the front crank mechanism 276) is provided with a zero-point detection sensor (not shown). The zero-point detection sensor may for example include a permanent magnet (not shown) fixed to the crank plate 294 and a Hall element (not shown) fixed to the guide plate 300. The zero-point detection sensor is configured to detect whether the crank plates 294, 322 are at a zero-point position, where the zero-point position is the center of the upper edge of the side-stepping track S in the left-right direction.

As shown in FIG. 13, the worm gear casing 283 is arranged on the rear side of the pulley 282 of the front crank mechanism 276. The worm gear casing 283 is fixed to the support plate 278 of the front crank mechanism 276. The gearbox 281 is arranged on the right side of the worm gear casing 283 and is fixed to the worm gear casing 283. The stepper motor 279 is arranged on the right side of the gearbox 281 and is supported by the gearbox 281. The stepper motor 279 may for example be a DC brush motor. The stepper motor 279 is coupled to the pulley 282 via a reduction gear (not shown) incorporated in the gearbox 281 and a worm gear (not shown) incorporated in the worm gear casing 283. When the stepper motor 279 rotates in a forward direction or a reverse direction, the pulleys 280, 282, 308, 310 thereby rotate in the forward direction or the reverse direction, by which the crank plates 294, 322 move rightward or leftward along the side-stepping track S, and the step bars 272, 274 also move rightward or leftward along the side-stepping track S. As shown in FIG. 1, the base plate 204 includes a through hole 204b for avoiding interference with the stepper motor 279, the gearbox 281, and the worm gear casing 283.

Figure 17:
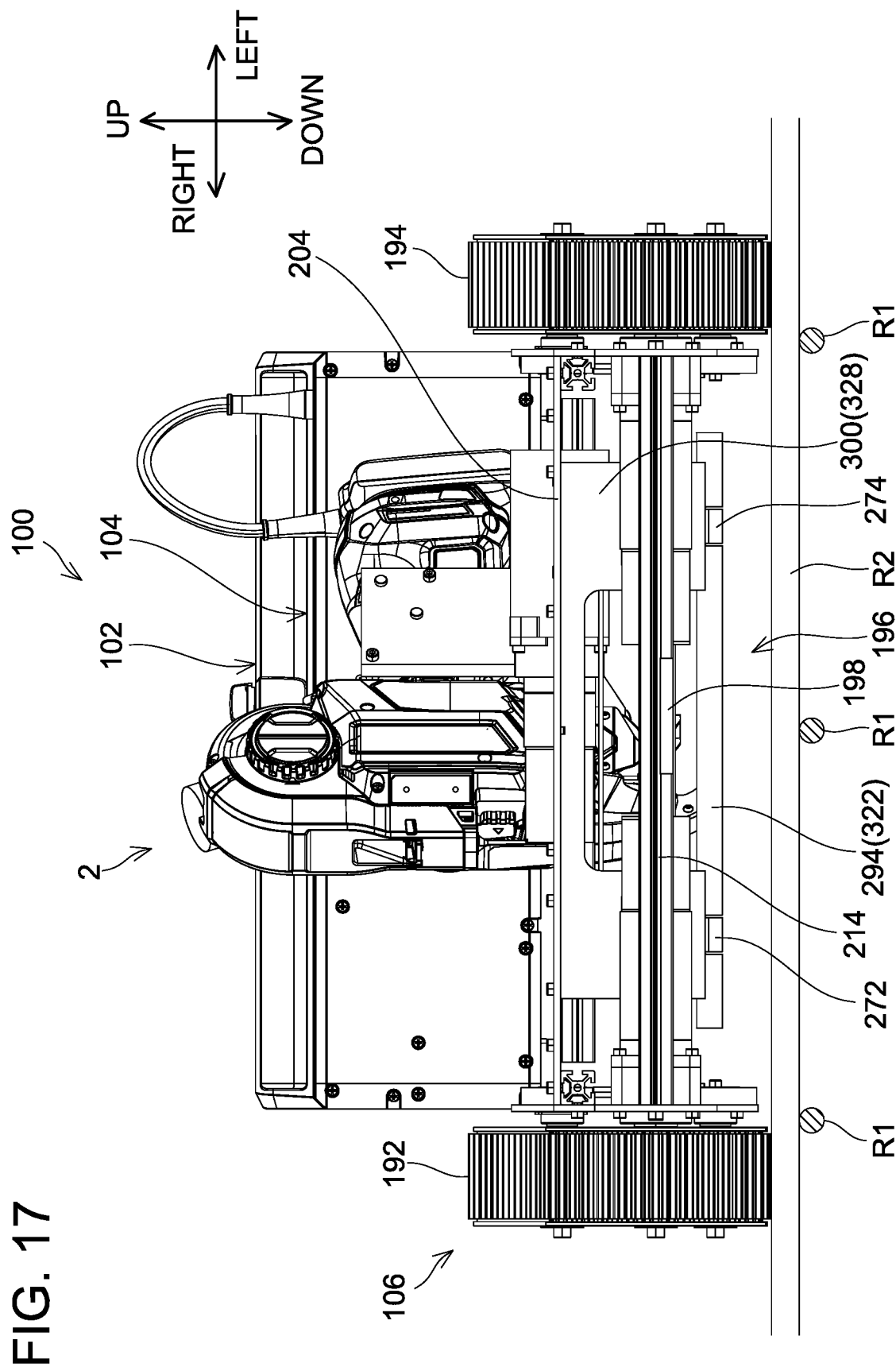
FIG. 17 is a front view of the rebar tying robot 100 of the embodiment viewed from the front side with step bars 272, 274 lifted.

As shown in FIG. 17, in the state in which the crank plates 294, 322 are located at the upper edge of the side-stepping track S (see FIG. 15) and the step bars 272, 274 are lifted up, the crank plates 294, 322 and the step bars 272, 274 are separated from the first rebars R1 and the second rebars R2. In this state, since the right crawler 192 and the left crawler 194 are in contact with the first rebars R1 and the second rebars R2, the rebar tying robot 100 drives the right crawler 192 and the left crawler 194 and thus can move in the front-rear direction.

Figure 18:
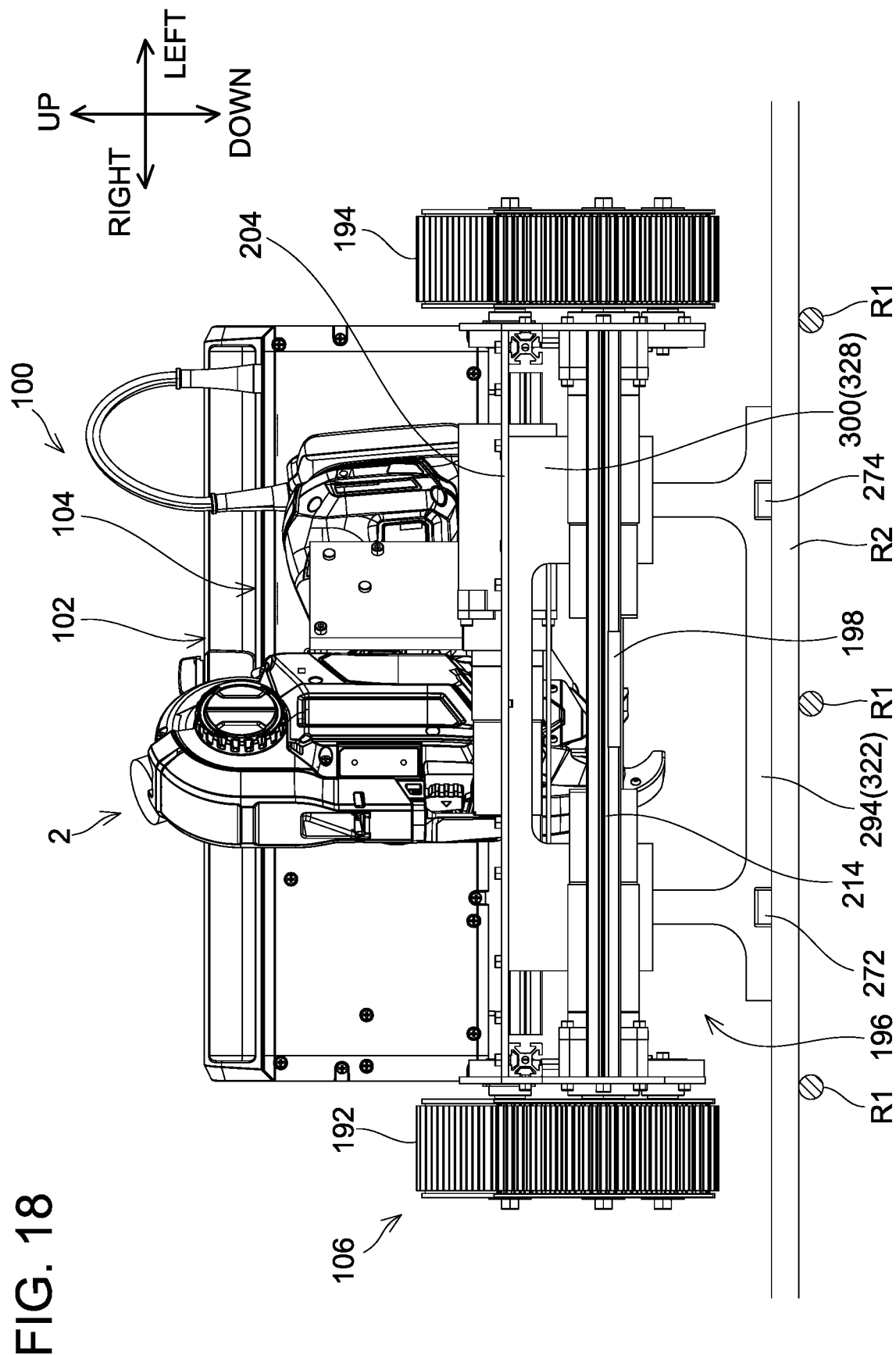
FIG. 18 is a front view of the rebar tying robot 100 of the embodiment viewed from the front side with the step bars 272, 274 lowered.

When the stepper motor 279 is rotated from the state shown in FIG. 17, the crank plates 294, 322 move along the side-stepping track S (see FIG. 15), accompanying which the step bars 272, 274 move downward, and the crank plates 294, 322 and the step bars 272, 274 come into contact with the second rebars R2. When the stepper motor 279 is further rotated from this state, the crank plates 294, 322 and the step bars 272, 274 further move downward, as a result of which the right crawler 192 and the left crawler 194 separate from the second rebars R2 as shown in FIG. 18. By further continuing to rotate the stepper motor 279, the rebar tying robot 100 moves rightward or leftward by a step width corresponding to a width of the side-stepping track S in the left-right direction, after which the crank plates 294, 322 and the step bars 272, 274 move upward, by which the right crawler 192 and the left crawler 194 comes into contact again with the first rebars R1 and the second rebars R2 and the crank plates 294, 322 and the step bars 272, 274 separate from the second rebars R2. When the zero-point detection sensor detects that the crank plates 294, 322 have moved to the zero-point position, rotation of the stepper motor 279 stops. As above, by driving the side stepper 196, the rebar tying robot 100 can move rightward or leftward by a predetermined step width.

The side-stepping track S defined by the guide grooves 302, 304, 330, 332 is not limited to the aforementioned substantially rectangular shape, but may have various other shapes. The shape may be any shape so long as that, upon when the step bars 272, 274 move along the side-stepping track S, lower ends of the step bars 272, 274 move to positions lower than the lower ends of the right crawler 192 and the left crawler 194, and then the lower ends of the step bars 272, 274 move in the left-right direction and then the lower ends of the step bars 272, 274 move to positions higher than the right crawler 192 and the left crawler 194. For example, the side-stepping track S may be circular, oval, triangular with its bottom edge on the lower side, or polygonal such as pentagon or with more vertices.

As shown in FIG. 11, the rebar detection sensor 198 is arranged on a front surface of the front frame 214 in the vicinity of the center of the front frame 214 in the left-right direction. The rebar detection sensor 200 is arranged on a rear surface of the rear frame 216 in the vicinity of the center of the rear frame 216 in the left-right direction. The rebar detection sensor 202 is arranged on the lower surface of the base plate 204 in the vicinity of the center of the left end of the base plate 204 in the front-rear direction. The rebar detection sensors 198, 200, 202 are arranged facing downward. The rebar detection sensors 198, 200, 202 are Time-of Flight (TOF) sensors configured to obtain depth image data obtained by measuring a distance to a target subject, for example. The control unit 126 of the rebar tying robot 100 is configured to identify a relative arrangement of the first rebars R1 and the second rebars R2 relative to each of the rebar detection sensors 198, 200, 202 based on the depth image data obtained by the rebar detection sensors 198, 200, 202.

(Operation of Rebar Tying Robot 100)

Figure 19:
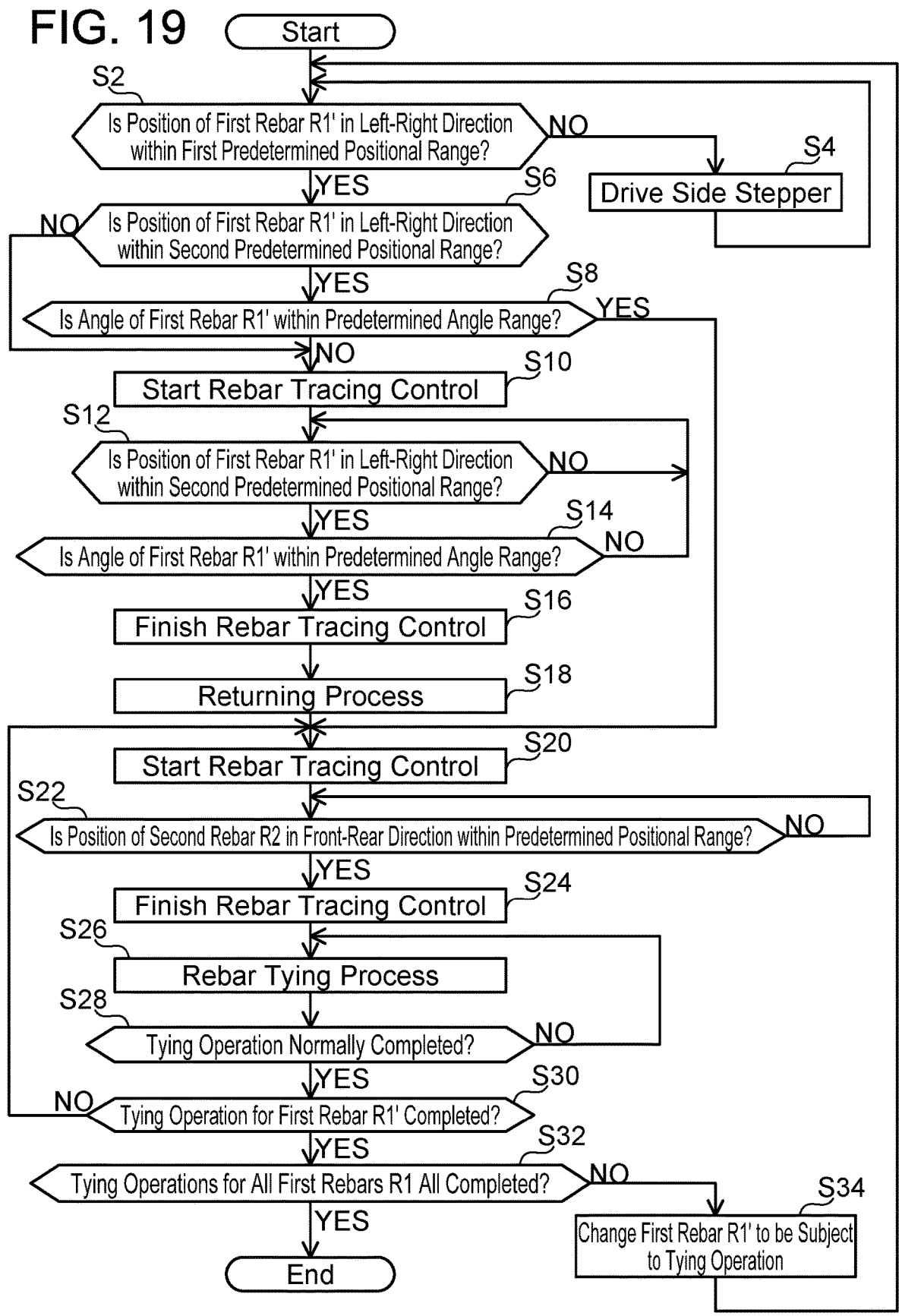
FIG. 19 is a flowchart of processes which a control unit 126 executes in the rebar tying robot 100 of the embodiment.

When the user operates the operation execution button 122 and execution of the operation of the rebar tying robot 100 is instructed, the control unit 126 executes processes shown in FIG. 19.

In S2, the control unit 126 determines whether a position of a first rebar R1' that is to be subjected to tying operation among the plurality of first rebars R1 in the left-right direction, which is detected by the rebar detection sensor 198, is within a first predetermined positional range from a reference position. The reference position referred herein is a position at which an intersecting point of the first rebar R1 and the second rebar R2 should be located upon when the operation unit 104 lowers the rebar tying machine 2 and performs the tying operation. For example, with respect to the front-rear direction and the left-right direction, the reference position is located at the center of the base plate 204 in the front-rear direction and the left-right direction. Further, the first predetermined positional range referred herein is a range based on which it is determined that the side stepper 196 needs to move in the left-right direction when the position of the first rebar R1' in the left-right direction is displaced from this range. In the case in which the position of the first rebar R1' is not within the first predetermined positional range from the reference position (case of NO), the process proceeds to S4.

In S4, the control unit 126 drives the side stepper 196 and moves the rebar tying robot 100 rightward or leftward. After the process of S4, the process returns to S2.

In the case in which the position of the first rebar R1' is within the first predetermined positional range from the reference position (case of YES) in S2, the process proceeds to S6. In S6, the control unit 126 determines whether the position of the first rebar R1' in the left-right direction is within a second predetermined positional range from the reference position. The second predetermined positional range is a range that is smaller than the first predetermined positional range, and is a range based on which the tying operation by the rebar tying machine 2 can be carried out so long as the position of the first rebar R1' is within this range. In the case in which the position of the first rebar R1' in the left-right direction is not within the second predetermined positional range (case of NO), the process proceeds to S10. In the case in which the position of the first rebar R1' in the left-right direction is within the second predetermined positional range (case of YES), the process proceeds to S8.

In S8, the control unit 126 determines whether an angle of the first rebar R1 detected by the rebar detection sensor 198 is within a predetermined angle range from a reference angle. The reference angle referred herein is an angle which the first rebar R1' should have at the intersecting point of the first rebar R1 and the second rebar R2 upon when the operation unit 104 lowers the rebar tying machine 2 and performs the tying operation. For example, the reference angle may be zero degrees. Further, the predetermined angle range referred herein is a range in which the tying operation by the rebar tying machine 2 can be carried out so long as an angle of the first rebar R1' is within this range. In the case in which the angle of the first rebar R1' is not within the predetermined angle range (case of NO), the process proceeds to S10. In the case in which the angle of the first rebar R1' is within the predetermined angle range (case of YES), the process proceeds to S20.

In S10, the control unit 126 starts rebar tracing control. In the rebar tracing control, the control unit 126 causes the rebar tying robot 100 to move forward or rearward while providing a speed difference between the right crawler 192 and the left crawler 194 and brings the position of the first rebar R1' in the left-right direction and the angle thereof closer to the reference position and the reference angle. Details of the rebar tracing control will be described later.

In S12, the control unit 126 determines whether the position of the first rebar R1 in the left-right direction is within the second predetermined positional range from the reference position. In the case in which the position of the first rebar R1 in the left-right direction is not within the second predetermined positional range (case of NO), the process returns to S10. In the case in which the position of the first rebar R1 in the left-right direction is within the second predetermined range (case of YES), the process proceeds to S14.

In S14, the control unit 126 determines whether the angle of the first rebar R1 detected by the rebar detection sensor 198 is within the predetermined angle range from the reference angle. In the case in which the angle of the first rebar R1 is not within the predetermined angle range (case of NO), the process returns to S10. In the case in which the angle of the first rebar R1 is within the predetermined angle range (case of YES), the process proceeds to S16.

Figure 20:
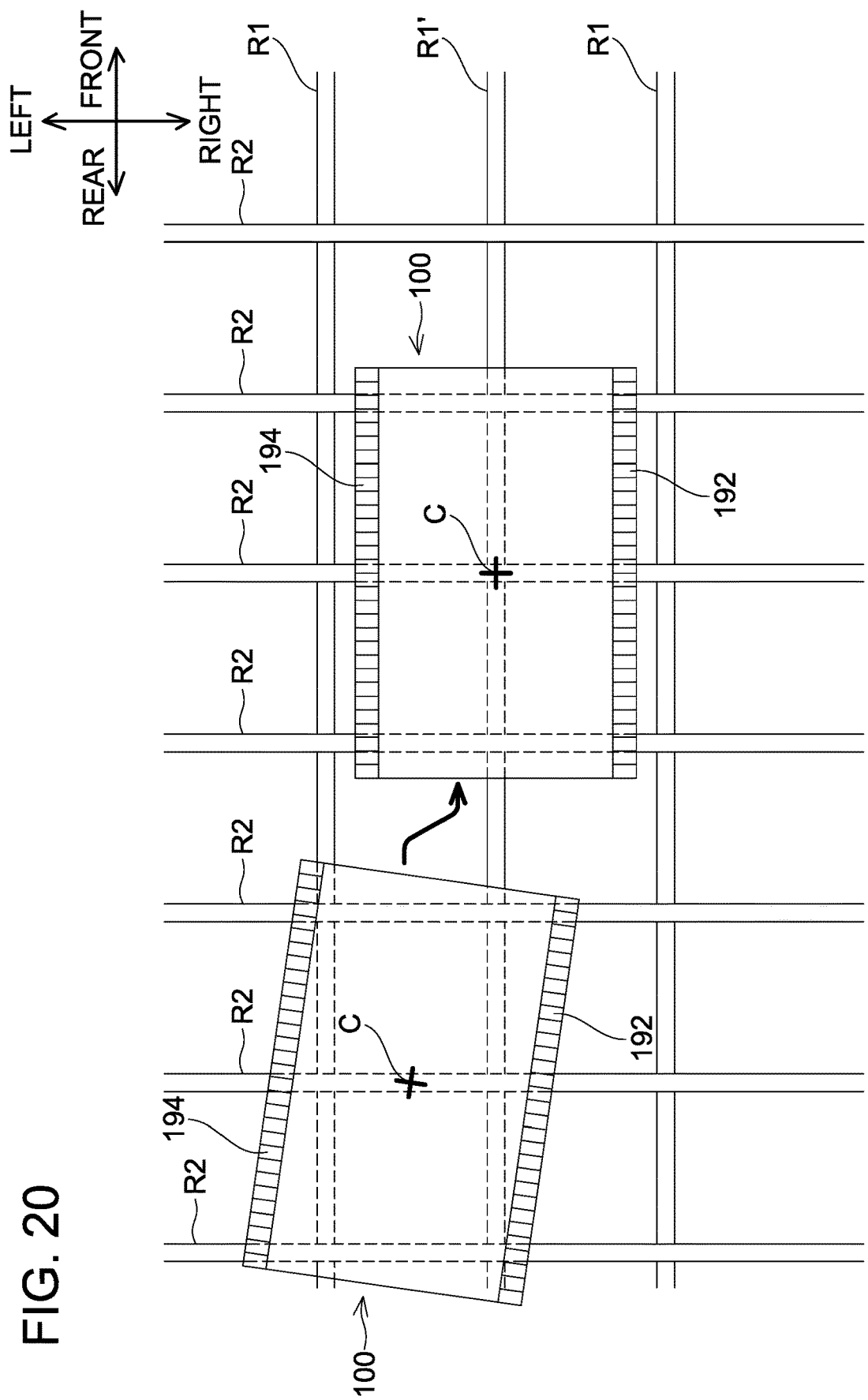
FIG. 20 is a top view showing an example of an operation of the rebar tying robot 100 of the embodiment.

In S16, the control unit 126 terminates the rebar tracing control. By executing the processes from S10 to S16, the rebar tying robot 100 moves such that the position of the first rebar R1' in the left-right direction and the angle thereof coincide with the reference position and the reference angle as shown in FIG. 20. In FIGS. 20 to 23, the reference position and the reference angle of the rebar tying robot 100 are represented by a cross-shaped cursor C.

Figure 21:
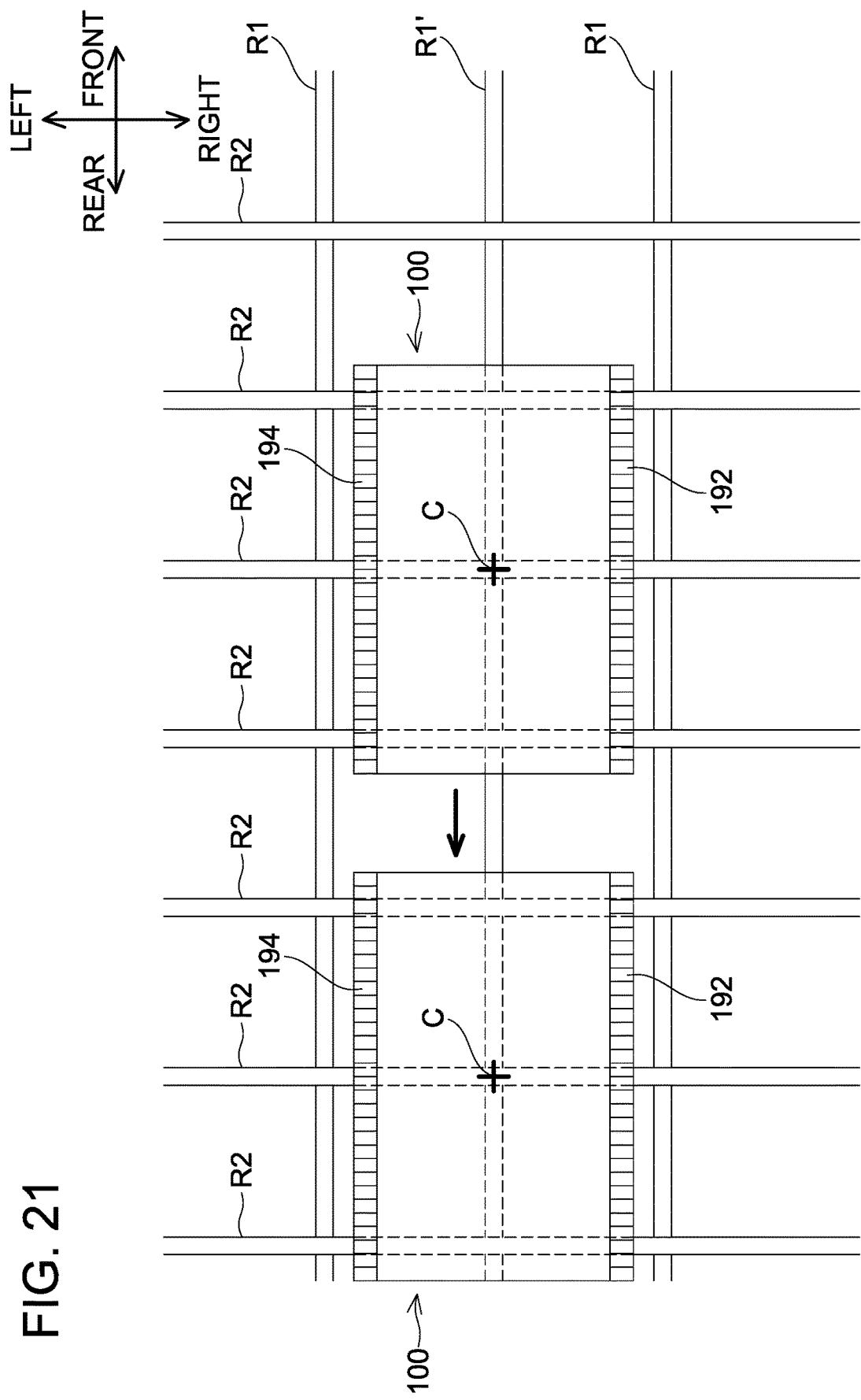
FIG. 21 is a top view showing another example of the operation of the rebar tying robot 100 of the embodiment.
Figure 22:
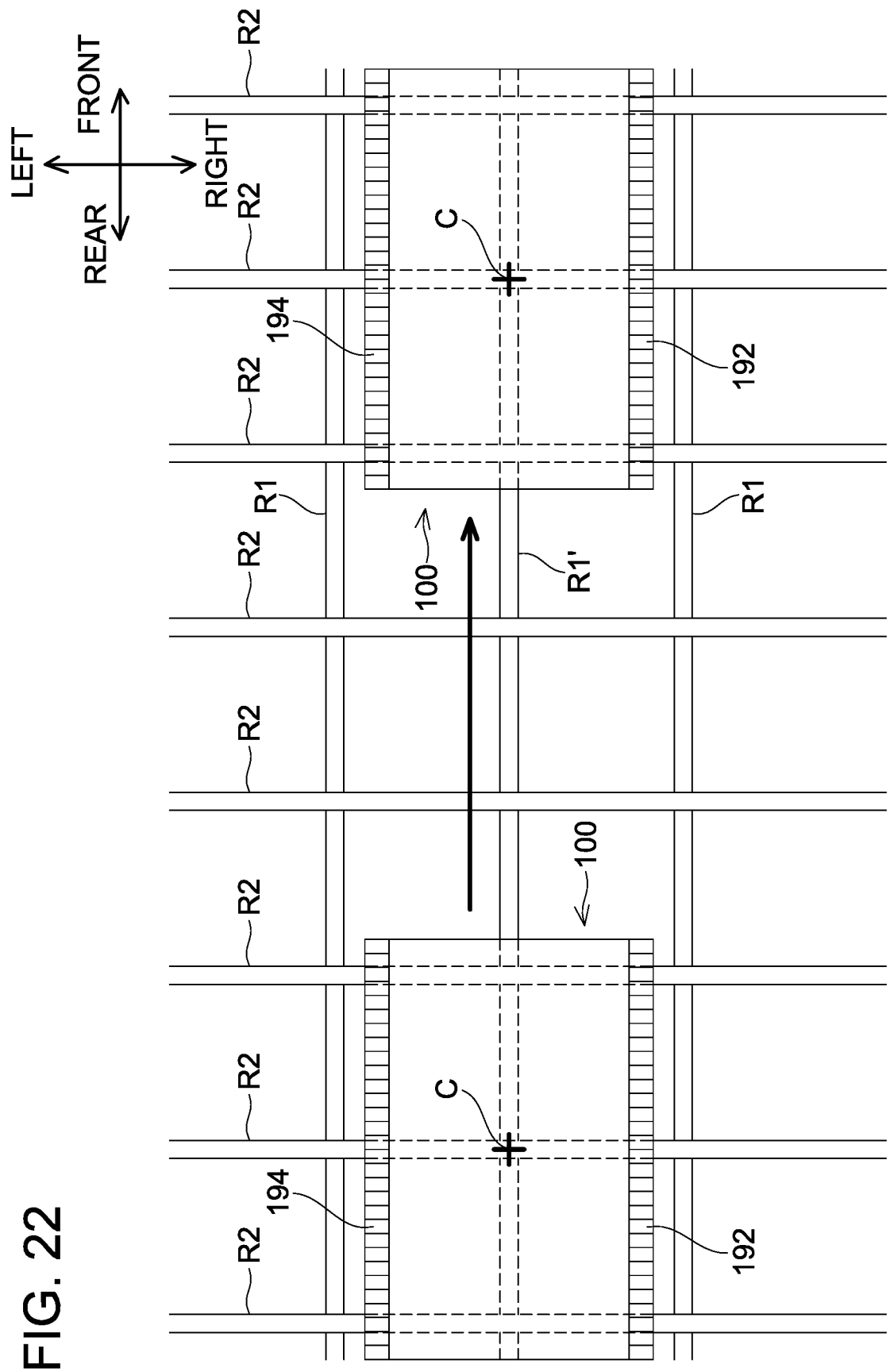
FIG. 22 is a top view showing yet another example of the operation of the rebar tying robot 100 of the embodiment.

As shown in FIG. 19, in S18, the control unit 126 executes a returning process. In the returning process, the control unit 126 causes the rebar tying robot 100 to move in an opposite direction to the direction in which the rebar tying robot 100 moved in S10 that took place immediately before this process. In this process, the control unit 126 causes the rebar tying robot 100 to move while providing a speed difference between the right crawler 192 and the left crawler 194 such that the position of the first rebar R1' in the left-right direction and the angle thereof that were brought to be within the second predetermined positional range and in the predetermined angle range in the processes of S10 to S16 that took place immediately before this process do not deviate out of the second predetermined positional range and the predetermined angle range. The control unit 126 measures a frontward or rearward moving distance of the rebar tying robot 100 from when the rebar tracing control was started in S10 until the rebar tracing control is terminated in S16, and causes the rebar tying robot 100 to move in a reverse direction by the same moving distance in the returning process of S18. By executing the returning process of S18, the rebar tying robot 100 moves in the reverse direction while maintaining the position of the first rebar R1' in the left-right direction and the angle thereof coinciding with the reference position and the reference angle as shown in FIG. 21. As shown in FIG. 19, the process proceeds to S20 after S18.

In S20, the control unit 126 starts the rebar tracing control similar to S10. Due to this, the rebar tying robot 100 starts to move forward or rearward along the first rebar R1'.

In S22, the control unit 126 determines whether a position of a second rebar R2 in the front-rear direction, which is detected by the rebar detection sensor 202, is within a predetermined positional range from a reference position. The predetermined positional range referred herein is a range within which the tying operation by the rebar tying machine 2 can be carried out so long as the position of the position of the second rebar R2 is within this range. In the case in which the position of the second rebar R2 in the front-rear direction is not within the predetermined positional range (case of NO), the process returns to S22. In the case in which the position of the second rebar R2 in the front-rear direction is within the predetermined positional range (case of YES), the process proceeds to S24.

In S24, the control unit 126 terminates the rebar tracing control.

In S26, the control unit 126 executes a rebar tying process. In the rebar tying process, the control unit 126 drives the lifter mechanism 130 to lower the rebar tying machine 2 and set the rebar tying machine 2 at an intersecting point of the first rebar R1' and the second rebar R2, and drives the grip mechanism 132 to carry out the tying operation on the first rebar R1' and the second rebar R2 by the rebar tying machine 2. After this, the control unit 126 drives the lifter mechanism 130 and lifts up the rebar tying machine 2. After S26, the process proceeds to S28.

In S28, the control unit 126 determines whether the tying operation carried out in S26 was completed normally. In the case in which it is determined that the tying operation was not completed normally (case of NO), the process returns to S26. In the case in which it is determined that the tying operation was completed normally (case of YES), the process proceeds to S30.

In S30, the control unit 126 determines whether tying operation(s) for the first rebar R1' have all been completed. In the case in which it is determined that they have not yet been completed (case of NO), the process returns to S20. By repeating the processes from S20 to S30, the rebar tying robot 100 moves along the first rebar R1' and repeatedly carries out the tying operation on each of intersecting points of the first rebar R1' and the respective second rebars R2 as shown in FIG. 21.

As shown in FIG. 19, in the case in which it is determined that the tying operation(s) for the first rebar R1' have all been completed in S30 (if YES), the process proceeds to S32.

In S32, the control unit 126 determines whether tying operations have been completed for all of the first rebars R1. In the case it is determined that they have not yet been completed (case of NO), the process proceeds to S34.

In S34, the control unit 126 changes the first rebar R1' to be subjected to the tying operation to a different first rebar R1 for which tying operation(s) have not yet been completed. After S34, the process returns to S2.

In the case in which it is determined that the tying operations for all of the first rebars R1 have all been completed in S32 (case of YES), the process of FIG. 19 is terminated.

In the process of FIG. 19, when the rebar tying robot 100 repeatedly carries out the tying operation on the intersecting points of the first rebar R1' and the second rebars R2, every other intersecting point of the first rebar R1' and the second rebars R2 may be tied. In this case, the rebar tying robot 100 may select the intersecting point that is to be subjected to the tying operation such that at least one of adjacent intersecting points is eventually tied.

(Rebar Tracing Control by Rebar Tying Robot 100)

Figure 23:
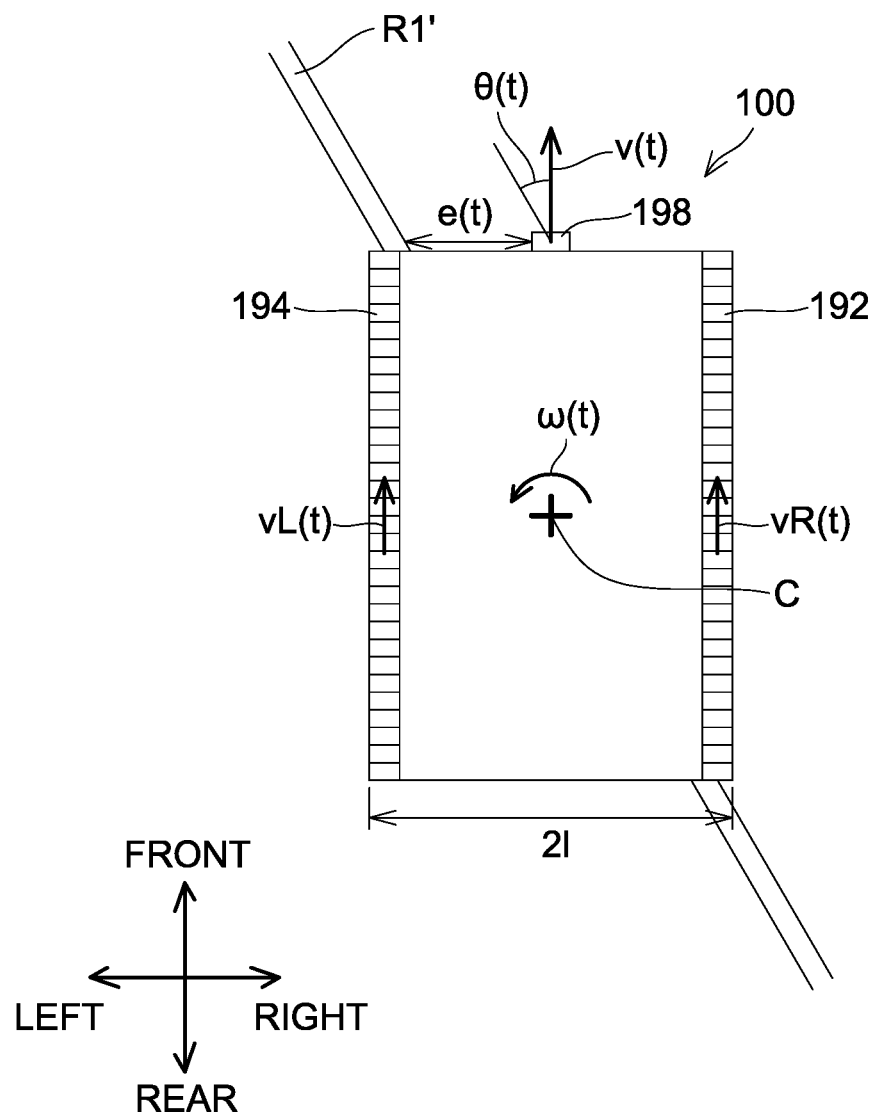
FIG. 23 is a top view showing an example of a relative positional relationship of the rebar tying robot 100 of the embodiment and a first rebar R1'.

When the rebar tying robot 100 is to be moved, the control unit 126 determines a moving speed $vR(t)$ of the right crawler 192 and a moving speed $vL(t)$ of the left crawler 194, and rotates the right crawler motor 228 at a rotary speed corresponding to the moving speed $vR(t)$ of the right crawler 192 and rotates the left crawler motor 254 at a rotary speed corresponding to the moving speed $vL(t)$ of the left crawler 194. As shown in FIG. 23, a forward moving speed $v(t)$ and an angular speed $\omega(t)$ for rotation about the up-down direction of the rebar tying robot 100 that are realized in this case are respectively given by the following equations.

$$v(t)=(vR(t)+vL(t))/2 \qquad (1)$$

$$\omega(t)=(vR(t)-vL(t))/2l \qquad (2)$$

where $2l$ is a distance between the right crawler 192 and the left crawler 194.

In the rebar tracing control executed in the process of FIG. 19, the control unit 126 determines $vR(t)$ and $vL(t)$ such that the reference position and the reference angle of the rebar tying robot 100 become closer to the position of the first rebar R1' in the left-right direction and the angle thereof. Specifically, the control unit 126 calculates $vR(t)$ and $vL(t)$ by the following equations:

$$vR(t)=v\text{const}+\Delta v(t) \qquad (3)$$

$$vL(t)=v\text{const}-\Delta v(t) \qquad (4)$$

where $v\text{const}$ is a constant value, and $\Delta v(t)$ is a calibration amount for bringing the reference position and the reference angle of the rebar tying robot 100 closer to the position of the first rebar R1' in the left-right direction and the angle thereof.

When $vR(t)$ and $vL(t)$ are given by the above equations (3), (4), the speed $v(t)$ and the angular speed $\omega(t)$ realized by the rebar tying robot 100 are as in the following equations:

$$v(t)=v\text{const} \qquad (5)$$

$$\omega(t)=\Delta v(t)/l \qquad (6)$$

As shown in FIG. 23, in assuming that the position of the first rebar R1 in the left-right direction (an amount displaced from the reference position) detected by the rebar detection sensor 198 arranged in a front part of the rebar tying robot 100 is e(t) and the angle of the first rebar R1 (an amount displaced from the reference angle) is θ(t), the control unit 126 calculates the calibration amount Δv(t) by the following equation:

$$\Delta v(t) = k1 \times e(t) + k2 \times e'(t) + k3 \times \theta(t) + k4 \times \theta'(t) \quad (7)$$

where e'(t) is a time differential of e(t), θ'(t) is a time differential of θ(t), and each of k1, k2, k3, and k4 is a positive constant.

As it is apparent from FIG. 23, when an angular speed ω(t)(=Δv(t)/l) is given upon when the rebar tying robot 100 is to move forward at a speed v, e(t) and θ(t) both become closer to zero as the rebar tying robot 100 moves forward. Due to this, by giving the calibration amount Δv(t) as in the above equation (7), the reference position and the reference angle of the rebar tying robot 100 can be brought closer to the position of the first rebar R1' in the left-right direction and the angle thereof.

Figure 24:
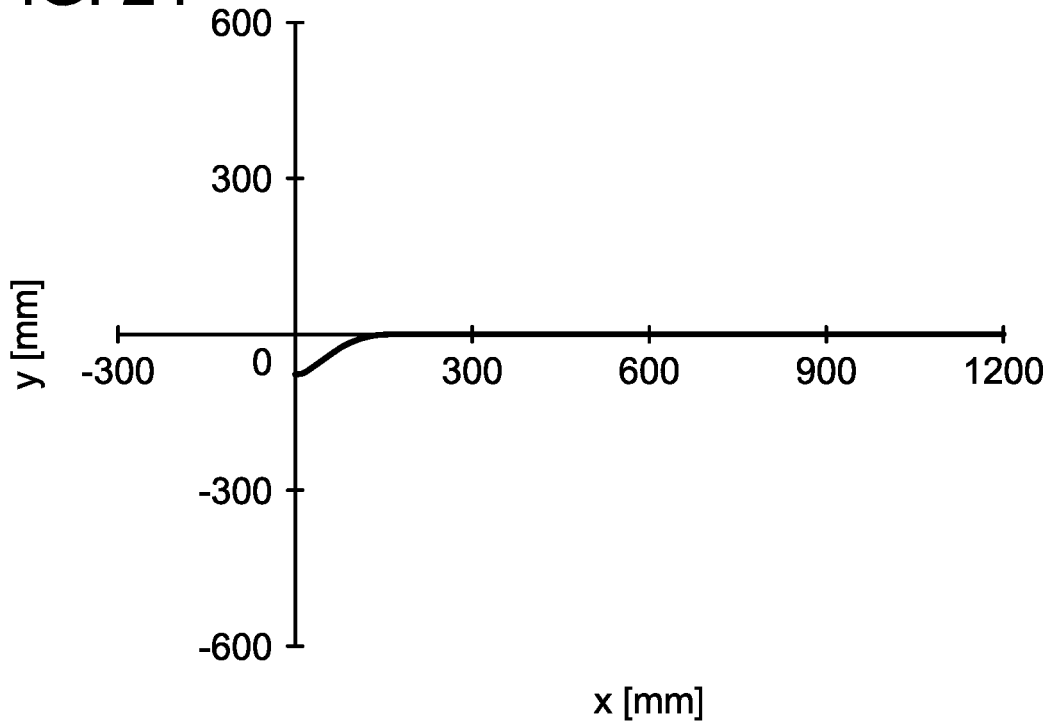
FIG. 24 is a graph showing an example of a track in rebar tracing control by the rebar tying robot 100 of the embodiment.
Figure 25:
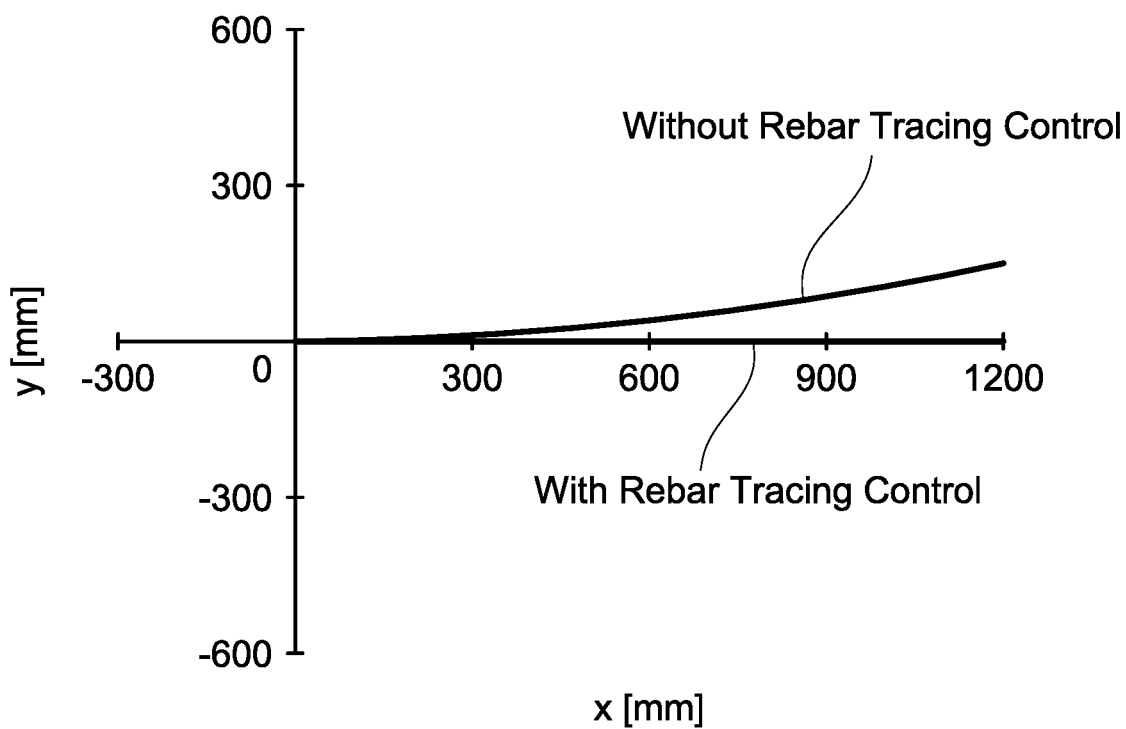
FIG. 25 is a graph showing an example of a difference in tracks with and without the rebar tracing control by the rebar tying robot 100 of the embodiment.
Figure 26:
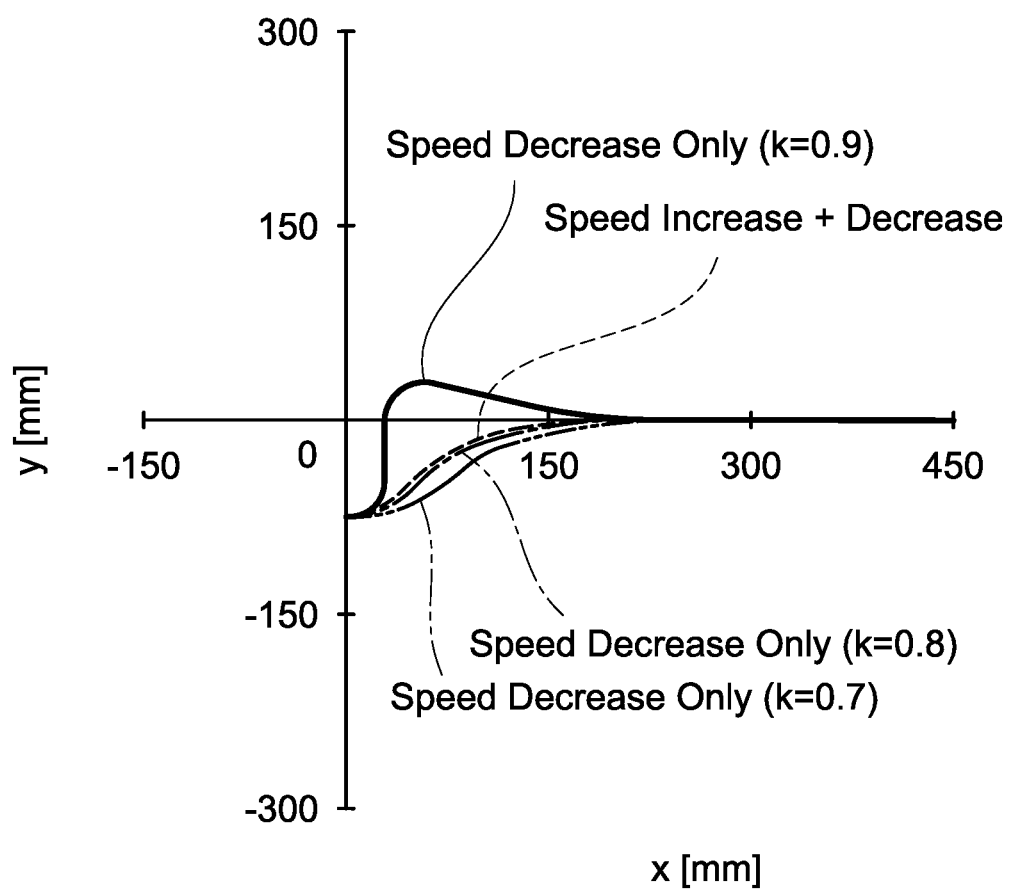
FIG. 26 is a graph showing an example of differences in tracks between multiple types of the rebar tracing control by the rebar tying robot 100 of the embodiment.

FIG. 24 shows a track of the rebar tying robot 100 moving forward by the rebar tracing control when a predetermined displacement amount is present between the reference position of the rebar tying robot 100 and the position of the first rebar R1' in the left-right direction. In FIGS. 24 to 26, x[mm] is a position in a direction along the first rebar R1' and y[mm] is a position in a direction perpendicularly intersecting the direction along the first rebar R1'. As shown in FIG. 24, by executing the rebar tracing control, the displacement amount between the reference position of the rebar tying robot 100 and the position of the first rebar R1' in the left-right direction is eliminated, and the rebar tying robot 100 can thereby move along the first rebar R1'.

FIG. 25 shows as another example a track of the rebar tying robot 100 moving forward when the right crawler 192 operates normally but the left crawler 194 is slipping. When the left crawler 194 slips, the actual moving speed of the left crawler 194 becomes slower. As such, if the rebar tracing control is not executed, the rebar tying robot 100 would gradually be displaced leftward from the first rebar R1' as shown in FIG. 25 as the rebar tying robot 100 moves forward. Contrary to this, when the rebar tracing control is executed, the calibration amount Δv(t) is given such that the reference position and the reference angle of the rebar tying robot 100 are brought closer to the position of the first rebar R1' in the left-right direction and the angle thereof even when the left crawler 194 is slipping, thus the rebar tying robot 100 can move forward along the first rebar R1' without deviating from the first rebar R1'.

When vR(t) and vL(t) are given by the above equations (3) and (4), vR(t) and vL(t) may each be a value exceeding vconst. Due to this, devices capable of operating at a high rotational speed need to be used as the right crawler motor 228 and the left crawler motor 254, which may undesirably increase sizes and weights of the right crawler motor 228 and the left crawler motor 254.

In view of the above, vR(t) and vL(t) may be given as follows instead of the above equations (3) and (4). That is, after having calculated Δv by the above equation (7), the following may be used:

if Δv≥0, $$vR(t) = v\text{const} \quad (8)$$

$$vL(t) = v\text{const} - 2\Delta v(t) \quad (9), \text{ and}$$

if Δv<0, $$vR(t) = v\text{const} + 2\Delta v(t) \quad (10)$$

$$vL(t) = v\text{const} \quad (11).$$

When vR(t) and vL(t) are given by the above equations (8), (9), (10), and (01), vR(t) and vL(t) never exceed vconst. As such, devices that are capable of rotating at vconst may be just used as the right crawler motor 228 and the left crawler motor 254, thus the undesirable increase in sizes and weights of the right crawler motor 228 and the left crawler motor 254 can be suppressed.

When vR(t) and vL(t) are given by the above equations (8), (9), (10), and (11), the speed v(t) and the angular speed o(t) realized by the rebar tying robot 100 are as in the following equations:

$$v(t) = v\text{const} - |\Delta v| \quad (12)$$

$$\omega(t) = \Delta v(t)/l \quad (13)$$

That is, when vR(t) and vL(t) are determined by the above equations (8), (9), (10), and (11), the forward moving speed v(t) of the rebar tying robot 100 decreases by |Δv| from vconst. Due to this, if |Δv| becomes greater than vconst, the rebar tying robot 100 can no longer move forward, and moves rearward instead.

Thus, in the present embodiment, upper and lower limits are set for Δv(t) by the following equation.

$$|\Delta v(t)| < k \times v\text{const} \quad (14)$$

where 0<k≤1.

FIG. 26 shows tracks of the rebar tying robot 100 in the case in which vR(t) and vL(t) are given by using the equations (3), (4) (indicated as "speed increase+decrease" in FIG. 26) and in the case in which vR(t) and vL(t) are given using the equations (8), (9), (10), (11), and (14) (indicated as "speed decrease only" in FIG. 26). As shown in FIG. 26, when vR(t) and vL(t) are given using the equations (8), (9), (10), (11), and (14), the track of the rebar tying robot 100 more promptly becomes closer to the first rebar R1' as a value of k in the equation (14) increases. However, when the value of k becomes excessively large, an overshoot occurs and convergence of the track of the rebar tying robot 100 is delayed. Due to this, when vR(t) and vL(t) are given using the equations (8), (9), (10), (11), and (14), the track of the rebar tying robot 100 can promptly be brought closer to the first rebar R1' by setting k=0.8 for example.

In the above embodiment, a configuration in which the rebar tying robot 100 moves forward along the first rebar R1' and ties the first rebar R1' and the second rebars R2 at points at which these rebars intersect by using measurements by the rebar detection sensor 198 arranged at a front end has been explained. Unlike this, a configuration in which the rebar tying robot 100 moves rearward along the first rebar R1' and ties the first rebar R1' and the second rebars R2 at points at which these rebars intersect by using measurements by the rebar detection sensor 200 arranged at the rear end may be employed. Alternatively, a configuration in which the rebar tying robot 100 moves forward along the first rebar R1' and ties the first rebar R1' and the second rebars R2 at points at which these rebars intersect by using measurements by two or more of the rebar detection sensor 198 arranged at the front end, the rebar detection sensor 200 arranged at the rear end, and the rebar detection sensor 202 arranged in the vicinity of the center in the front-rear direction may be employed.

In the above embodiment, a configuration in which the reel 10 is attached to the rebar tying machine 2 and the rebar tying machine 2 ties the rebars R using the wire W supplied from the reel 10 has been explained. Unlike this, a configuration in which a wire supply unit (not shown) having a large reel (not shown) is incorporated in the conveying unit 106 of the rebar tying robot 100 and the rebar tying machine 2 ties the rebars R using the wire W supplied from the wire supply unit may be employed.

In the above embodiment, the case in which a commercially-available rebar tying machine 2 (such as TR180D distributed by Makita Corporation) is detachably attached to the rebar tying robot 100 has been explained. Unlike this, the rebar tying robot 100 may be configured to have a dedicated rebar tying unit (not shown) non-removably attached thereto. In this case, the rebar tying unit may be integrated with the operation unit 104.

In the above embodiment, an emergency shutdown button (not shown) for allowing the user to perform an emergency shutdown on the operation of the rebar tying robot 100 may be arranged on the rebar tying robot 100 (such as on the housing 110 of the power supply unit 102). In this case, when the emergency shutdown button is pressed by the user, the control unit 126 stops the right crawler motor 228, the left crawler motor 254, the stepper motor 279, and the lift motor 148, and turns off the actuator 180. When the user presses the operation execution button 122 again after having removed the danger, the control unit 126 firstly drives the stepper motor 279 to return the front crank mechanism 276 and the rear crank mechanism 277 to the zero-point position and drives the lift motor 148 to return the lifter mechanism 130 to the upper limit position. After this, the control unit 126 performs normal control to operate the rebar tying robot 100. The emergency shutdown button may be arranged in the vicinity of an outer periphery of the rebar tying robot 100, such as in the vicinity of the end in the front-rear direction or in the left-right direction. Further, multiple emergency shutdown buttons may be arranged.

In the above embodiment, an operation indicator (not shown) for displaying the operation state of the rebar tying robot 100 may be arranged on the rebar tying robot 100 (such as on the housing 110 of the power supply unit 102). In this case, the operation indicator may show the user a state of the tying operation which the rebar tying robot 100 performs. The state of the tying operation may include a state in which all of the intersecting points of the first rebar R1 and the second rebars R2 are to be tied and a state in which every other intersecting point of the first rebar R1 and the second rebars R2 is to be tied. Alternatively, the operation indicator may show the user a state in which the rebar tying robot 100 had stopped abnormally. The operation indicator may indicate the operation state of the rebar tying robot 100 by color(s) of light(s) emitted from one or more light emitting units, a blinking pattern, or a combination thereof. When the operation indicator is to be arranged on the housing 110, the operation indicator may be arranged at a high position to ensure its clear visibility even from a distance.

As above, in one or more embodiments, the rebar tying robot 100 is configured to tie the plurality of first rebars R1 and the plurality of second rebars R2 intersecting the plurality of first rebars R1 at points where the plurality of first rebars R1 and the plurality of second rebars R2 intersect. The rebar tying robot 100 comprises the rebar tying machine 2 (an example of the rebar tying unit), the conveying unit 106 configured to convey the rebar tying machine 2, and the control unit 126 configured to control the operation of the conveying unit 106. The conveying unit 106 comprises the right crawler 192 and the left crawler 194 (examples of the crawler) configured to move on the plurality of first rebars R1 and the plurality of second rebars R2.

As above, according to the configuration that comprises the right crawler 192 and the left crawler 194 configured to move on the plurality of first rebars R1 and the plurality of second rebars R2, degradation of a moving performance can be suppressed even when a weight of the rebar tying robot 100 increases.

In one or more embodiments, the conveying unit 106 further comprises the side stepper 196. The side stepper 196 comprises the step bars 272, 274 and the stepper motor 279 configured to drive the step bars 272, 274 along the predetermined side-stepping track S. When the step bars 272, 274 move along the side-stepping track S, the lower ends of the step bars 272, 274 move to positions lower than the lower ends of the right crawler 192 and the left crawler 194, then the lower ends of the step bars 272, 274 move in the left-right direction, and then the lower ends of the step bars 272, 274 move to positions higher than the lower ends of the right crawler 192 and the left crawler 194.

According to the above configuration, the right crawler 192 and the left crawler 194 can move in the front-rear direction and the side stepper also can move in the left-right direction on the plurality of first rebars R1 and the plurality of second rebars R2. A mobility performance of the rebar tying robot 100 can further be improved.

In one or more embodiments, the step bars 272, 274 extend in the front-rear direction.

When the plurality of second rebars R2 is arranged on top of the plurality of first rebars R1 as in the above embodiment, normally the rebar tying robot 100 move with the direction intersecting the plurality of second rebars R2 as its front-rear direction such that the right crawler 192 and the left crawler 194 each traverse across the plurality of second rebars R2. According to the above configuration, since the step bars 272, 274 used for the side stepper 196 to move in the left-right direction extend in the front-rear direction, the step bars 272, 274 can be arranged across the plurality of second rebars R2 when the step bars 272, 274 are lowered. By configuring as such, stability when the side stepper 196 moves in the left-right direction can further be improved.

In one or more embodiments, the step bars 272, 274 comprise the step bar 272 (an example of the first step bar) and the step bar 274 (an example of the second step bar) arranged on the left or right side of the step bar 272. The step bar 272 and the step bar 274 are coupled to each other.

According to the above configuration, since multiple step bars 272, 274 are used when the side stepper 196 moves in the left-right direction, the stability can further be improved. Further, according to the above configuration, since the step bar 272 and the step bar 274 are coupled to each other, their operations can mechanically be synchronized, and the stability when the side stepper 196 moves in the left-right direction can further be improved.

In one or more embodiments, the side-stepping track S may have the upper edge and the lower edge extending in the left-right direction, and the right edge and the left edge extending in the up-down direction.

According to the above configuration, the step width in the movement of the side stepper 196 in the left-right direction can be made constant.

In one or more embodiments, the rebar tying robot 100 further comprises the power supply unit 102 (an example of the battery) configured to supply power to the conveying unit 106. The stepper motor 279 is arranged at the front part of the rebar tying robot 100. The power supply unit 102 is arranged at the rear part of the rebar tying robot 100.

According to the above configuration, a gravity center of the rebar tying robot 100 can be suppressed from being displaced forward or rearward.

In one or more embodiments, the power from the power supply unit 102 is supplied also to the rebar tying machine 2.

According to the above configuration, a shared power supply unit 102 can be used to supply power to both the conveying unit 106 and the rebar tying machine 2.

In one or more embodiments, the right crawler 192 and the left crawler 194 are configured to operate separately.

According to the above configuration, not only the movement in the front-rear direction, but also movement in various other configurations can be realized by the right crawler 192 and the left crawler 194. The mobility performance of the rebar tying robot 100 can further be improved.

In one or more embodiments, the rebar tying robot 100 further comprises the rebar detection sensor 198 (an example of the position detection sensor) configured to detect the position of the first rebar R1' in the left-right direction to be subjected to the tying operation among the plurality of first rebars R1. The control unit 126 is configured to provide a speed difference between the right crawler 192 and the left crawler 194 so that the position of the first rebar R1' in left-right direction detected by the rebar detection sensor 198 becomes closer to the reference position.

If the position of the first rebar R1' in the left-right direction is displaced from the reference position, it may be difficult for the rebar tying machine to perform the tying operation. According to the above configuration, the rebar tying robot 100 can be moved so that the position of the first rebar R1' in the left-right direction becomes closer to the reference position.

In one or more embodiments, the rebar tying robot 100 further comprises the rebar detection sensor 198 (an example of the angle detection sensor) configured to detect the angle of the first rebar R1' to be subjected to the tying operation among the plurality of first rebars R1. The control unit 126 is configured to provide a speed difference between the right crawler 192 and the left crawler 194 so that the angle of the first rebar R1' detected by the rebar detection sensor 198 becomes closer to the reference angle.

If the angle of the first rebar R1' is displaced from the reference angle, it may be difficult for the rebar tying machine 2 to perform the tying operation. According to the above configuration, the rebar tying robot 100 can be moved so that the angle of the first rebar R1' becomes closer to the reference angle.

In one or more embodiments, the control unit 126 is configured to, when providing the speed difference between the right crawler 192 and the left crawler 194, cause one of the right crawler 192 and the left crawler 194 to operate at a normal speed and the other of the right crawler 192 and the left crawler 194 to operate at a speed reduced from the normal speed.

According to the above configuration, the speed difference can be provided between the right crawler 192 and the left crawler 194 without increasing the speeds of the right crawler 192 and the left crawler 194 beyond the normal speed. Due to this, the speed difference can be provided between the right crawler 192 and the left crawler 194 without size increase and weight increase in the right crawler motor 228 and the left crawler motor 254 that are for driving the right crawler 192 and the left crawler 194.

In one or more embodiments, the rebar tying machine 2 is detachably attached to the rebar tying robot 100. The rebar tying machine 2 comprises the grip 6 configured to be gripped by the user, the body 4 arranged at one end of the grip 6, and the battery receptacle 8 arranged on the other end of the grip 6 and configured to detachably receive the battery pack B.

According to the above configuration, the rebar tying machine 2 that is used in general and commercially available may be used by attaching the same to the rebar tying robot 100 as the rebar tying unit.

In one or more embodiments, the rebar tying robot 100 comprises the battery adapter 108 (an example of the adapter) configured to be detachably attached to the battery receptacle 8 in place of the battery pack B.

Normally, the battery pack B that is configured to be detachably attached to the rebar tying machine 2 is compact and thus has a small capacity, and it is difficult to perform work over a long period of time. According to the above configuration, since the power can be supplied from the rebar tying robot 100 to the rebar tying machine 2 through the battery adapter 108, work over a longer period of time can be performed as compared to the case in which the battery pack B is attached to the rebar tying machine 2.

The invention claimed is:

1. A rebar tying robot configured to tie a plurality of first rebars and a plurality of second rebars intersecting the plurality of first rebars at points where the plurality of first rebars and the plurality of second rebars intersect, the rebar tying robot comprising:
   a rebar tying unit;
   a conveying unit configured to convey the rebar tying unit; and
   a control unit configured to control an operation of the conveying unit, wherein
   the conveying unit comprises a crawler configured to move in a front-rear direction on the plurality of first rebars and the plurality of second rebars,
   the conveying unit further comprises a side stepper,
   the side stepper comprises:
      a step bar; and
      a stepper motor configured to drive the step bar along a predetermined side- stepping track,
   when the step bar moves along the side-stepping track, a lower end of the step bar moves to a position lower than a lower end of the crawler, then the lower end of the step bar moves in a left-right direction, and then the lower end of the step bar moves to a position higher than the lower end of the crawler, and
   the step bar extends in the front-rear direction.

2. The rebar tying robot according to claim 1, wherein the step bar comprises a first step bar and a second step bar arranged on a left or right side of the first step bar, and the first step bar and the second step bar are coupled to each other.

3. The rebar tying robot according to claim 2, wherein the side-stepping track has an upper edge and a lower edge extending in the left-right direction, and a right edge and a left edge extending in an up-down direction,
   the rebar tying robot further comprises a battery configured to supply power to the conveying unit,
   one of the battery and the stepper motor is arranged at a front part of the rebar tying robot, and the other of the battery and the stepper motor is arranged at a rear part of the rebar tying robot,
   the power from the battery is supplied to the rebar tying unit,
   the crawler comprises a right crawler and a left crawler configured to operate separately from the right crawler, the rebar tying robot further comprises a position detection sensor configured to detect a position of a first rebar in the left-right direction to be subjected to a tying operation among the plurality of first rebars, the control unit is configured to provide a speed difference between the right crawler and the left crawler so that a position of the first rebar in the left-right direction detected by the position detection sensor becomes closer to a reference position, the rebar tying robot further comprises an angle detection sensor configured to detect an angle of the first rebar to be subjected to the tying operation among the plurality of first rebars, the control unit is configured to provide the speed difference between the right crawler and the left crawler so that an angle of the first rebar detected by the angle detection sensor becomes closer to a reference angle, the control unit is configured to, when providing the speed difference between the right crawler and the left crawler, cause one of the right crawler and the left crawler to operate at a normal speed and the other of the right crawler and the left crawler to operate at a speed reduced from the normal speed, the rebar tying unit comprises a rebar tying machine configured to be detachably attached to the rebar tying robot, the rebar tying machine comprises:
  a grip configured to be gripped by a user;
  a body arranged at one end of the grip; and
  a battery receptacle arranged at the other end of the grip and configured to detachably receive a battery pack, and the rebar tying robot comprises an adapter configured to be detachably attached to the battery receptacle in place of the battery pack.

4. The rebar tying robot according to claim 1, wherein the side-stepping track has an upper edge and a lower edge extending in the left-right direction, and a right edge and a left edge extending in an up-down direction.

5. The rebar tying robot according to claim 1, further comprising
  a battery configured to supply power to the conveying unit, wherein
  one of the battery and the stepper motor is arranged at a front part of the rebar tying robot, and the other of the battery and the stepper motor is arranged at a rear part of the rebar tying robot.

6. The rebar tying robot according to claim 5, wherein the power from the battery is supplied to the rebar tying unit.

7. The rebar tying robot according to claim 1, wherein the rebar tying unit comprises a rebar tying machine configured to be detachably attached to the rebar tying robot, and
the rebar tying machine comprises:
  a grip configured to be gripped by a user;
  a body arranged at one end of the grip; and
  a battery receptacle arranged at the other end of the grip and configured to detachably receive a battery pack.

8. The rebar tying robot according to claim 7, further comprising
  an adapter configured to be detachably attached to the battery receptacle in place of the battery pack.

9. The rebar tying robot according to claim 1, further comprising:
  a battery holder configured to detachably receive a plurality of battery packs, wherein
  the power from the plurality of battery packs is supplied to the rebar tying unit and the conveying unit.

10. A rebar tying robot configured to tie a plurality of first rebars and a plurality of second rebars intersecting the plurality of first rebars at points where the plurality of first rebars and the plurality of second rebars intersect, the rebar tying robot comprising:
  a rebar tying unit;
  a conveying unit configured to convey the rebar tying unit; and
  a control unit configured to control an operation of the conveying unit, wherein
  the conveying unit comprises a crawler configured to move in a front-rear direction on the plurality of first rebars and the plurality of second rebars,
  the crawler comprises a right crawler and a left crawler,
  the rebar tying robot further comprises a position detection sensor configured to detect a position of a first rebar in the left-right direction to be subjected to a tying operation among the plurality of first rebars, and
  the control unit is configured to provide a speed difference between the right crawler and the left crawler so that a position of the first rebar in the left-right direction detected by the position detection sensor becomes closer to a reference position.

11. The rebar tying robot according to claim 10, further comprising
  an angle detection sensor configured to detect an angle of the first rebar to be subjected to the tying operation among the plurality of first rebars, wherein
  the control unit is configured to provide the speed difference between the right crawler and the left crawler so that an angle of the first rebar detected by the angle detection sensor becomes closer to a reference angle.

12. The rebar tying robot according to claim 10, wherein the control unit is configured to, when providing the speed difference between the right crawler and the left crawler, cause one of the right crawler and the left crawler to operate at a normal speed and the other of the right crawler and the left crawler to operate at a speed reduced from the normal speed.

13. A rebar tying robot configured to tie a plurality of first rebars and a plurality of second rebars intersecting the plurality of first rebars at points where the plurality of first rebars and the plurality of second rebars intersect, the rebar tying robot comprising:
  a rebar tying unit;
  a conveying unit configured to convey the rebar tying unit;
  a control unit configured to control an operation of the conveying unit; and
  a battery holder configured to detachably receive a plurality of battery packs, each of the plurality of battery packs being a battery pack configured to be detachably attached to a rebar tying machine independent of the rebar tying robot when each battery pack is detached from the battery holder.

14. The rebar tying robot according to claim 13, wherein the power from the plurality of battery packs is supplied to the rebar tying unit and the conveying unit.

* * * * *